March 4, 1930.  A. J. LEWIS  1,749,435
CHAIN MAKING MACHINE
Filed Nov. 17, 1924  13 Sheets-Sheet 1

Inventor
Arthur J. Lewis
By Wooster & Davis
Attorneys

March 4, 1930. A. J. LEWIS 1,749,435
CHAIN MAKING MACHINE
Filed Nov. 17, 1924 13 Sheets-Sheet 2

Inventor
Arthur J. Lewis
Wooster K Davis
Attorneys

March 4, 1930.  A. J. LEWIS  1,749,435
CHAIN MAKING MACHINE
Filed Nov. 17, 1924  13 Sheets-Sheet 4

Inventor
Arthur J. Lewis
By Wooster & Davis
Attorneys

March 4, 1930. A. J. LEWIS 1,749,435
CHAIN MAKING MACHINE
Filed Nov. 17, 1924 13 Sheets-Sheet 5
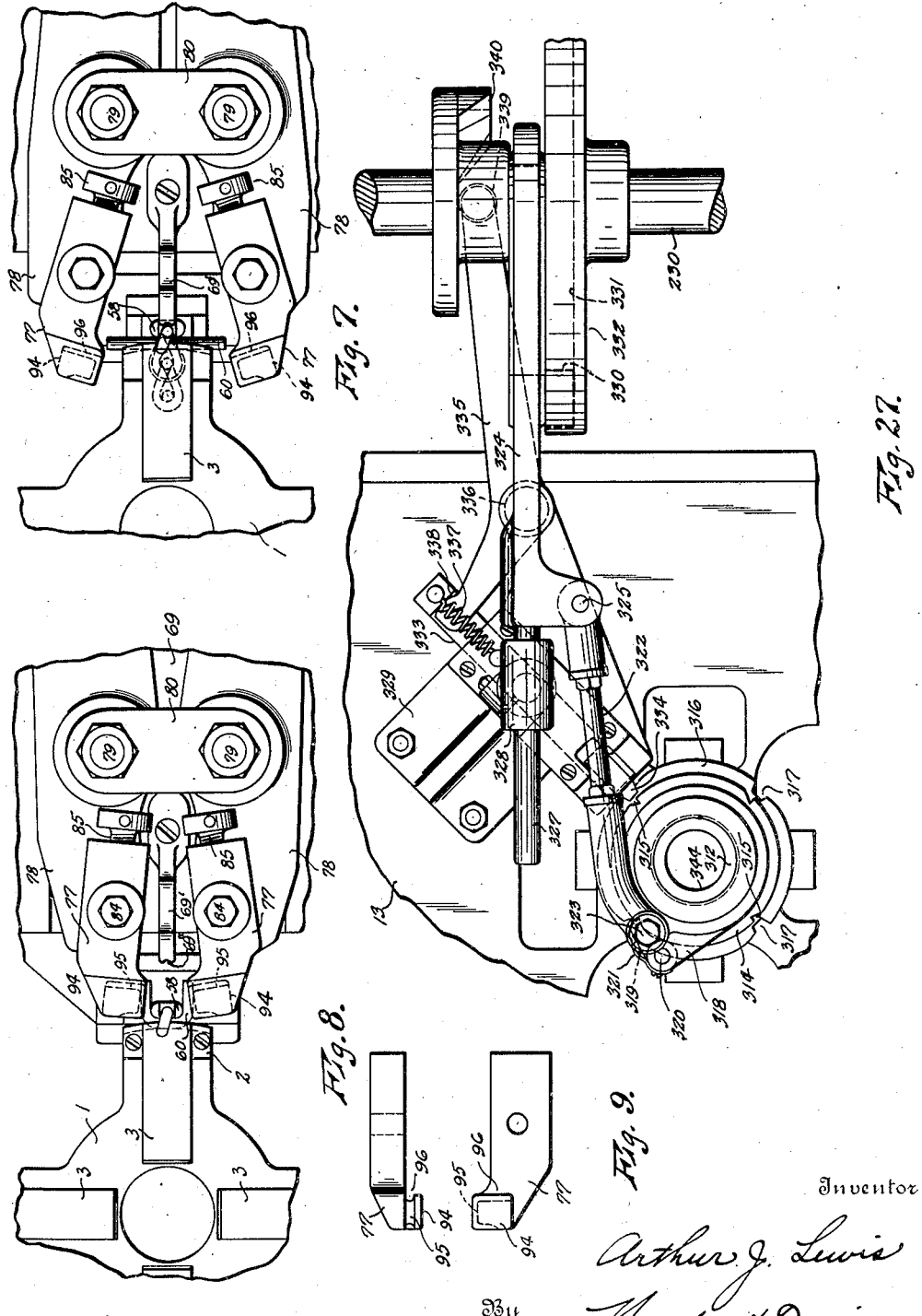
Inventor
Arthur J. Lewis
By Wooster & Davis
Attorneys

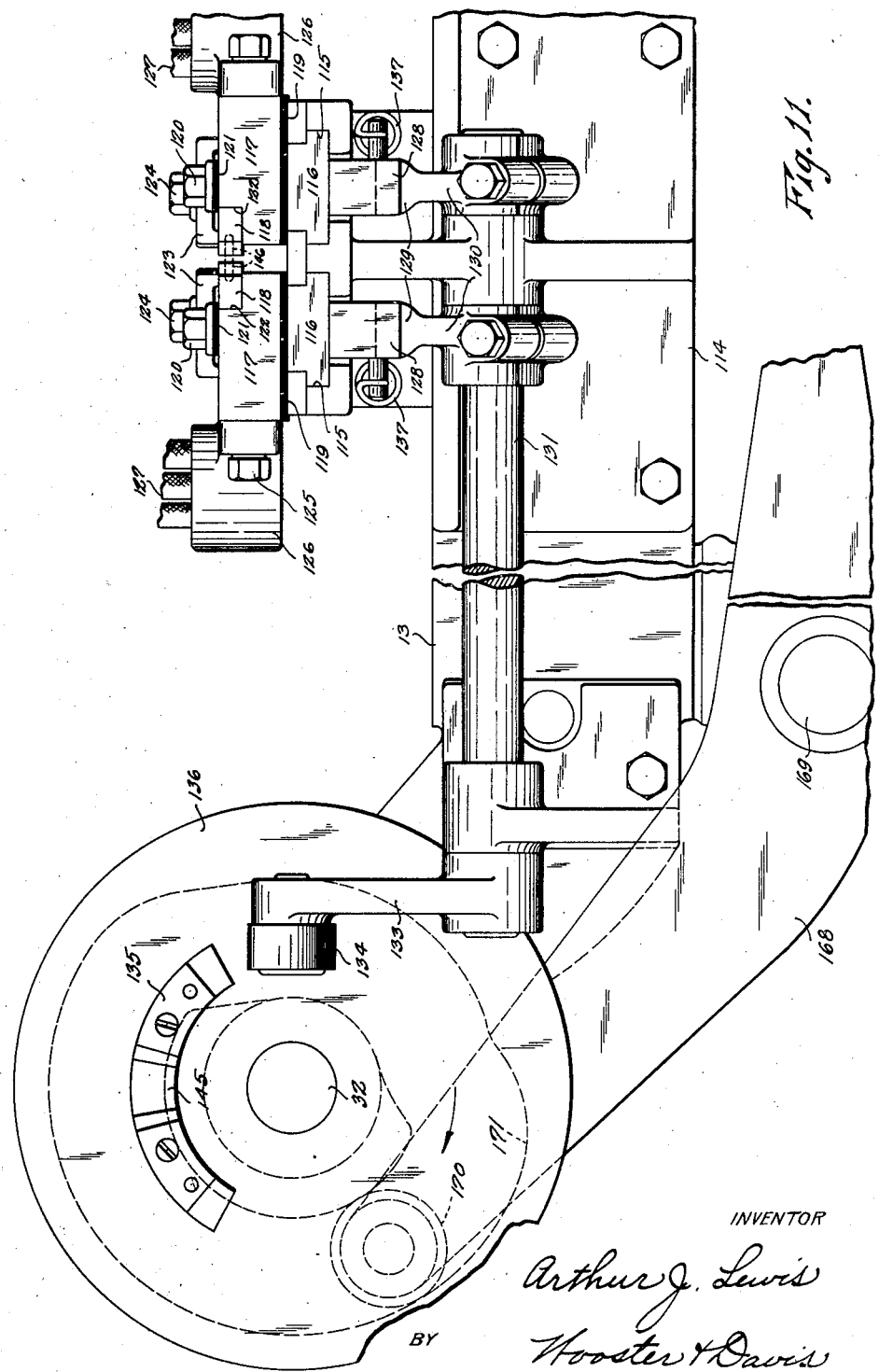

March 4, 1930.　　A. J. LEWIS　　1,749,435
CHAIN MAKING MACHINE
Filed Nov. 17, 1924　　13 Sheets-Sheet 8
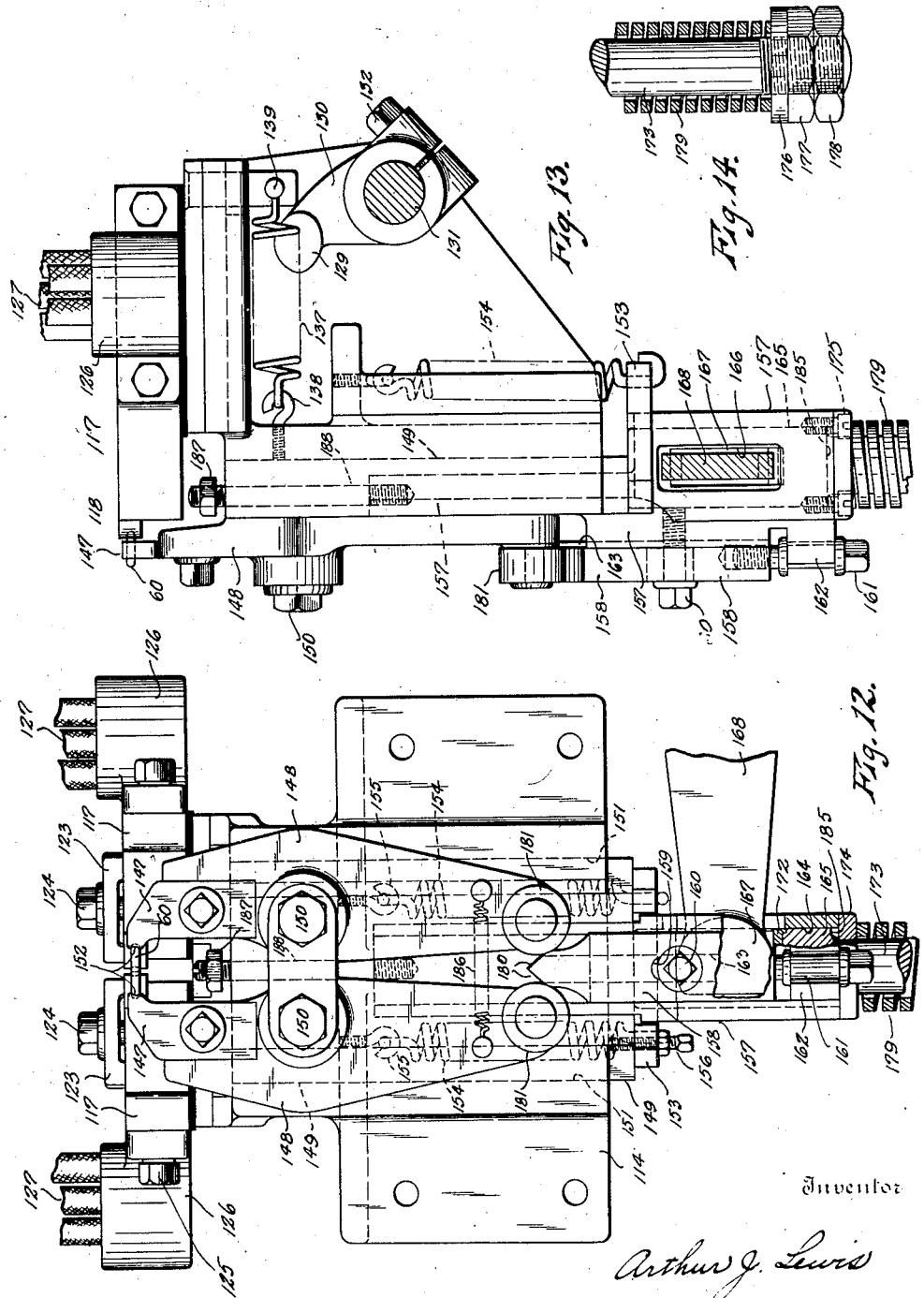

March 4, 1930.  A. J. LEWIS  1,749,435
CHAIN MAKING MACHINE
Filed Nov. 17, 1924   13 Sheets-Sheet 9
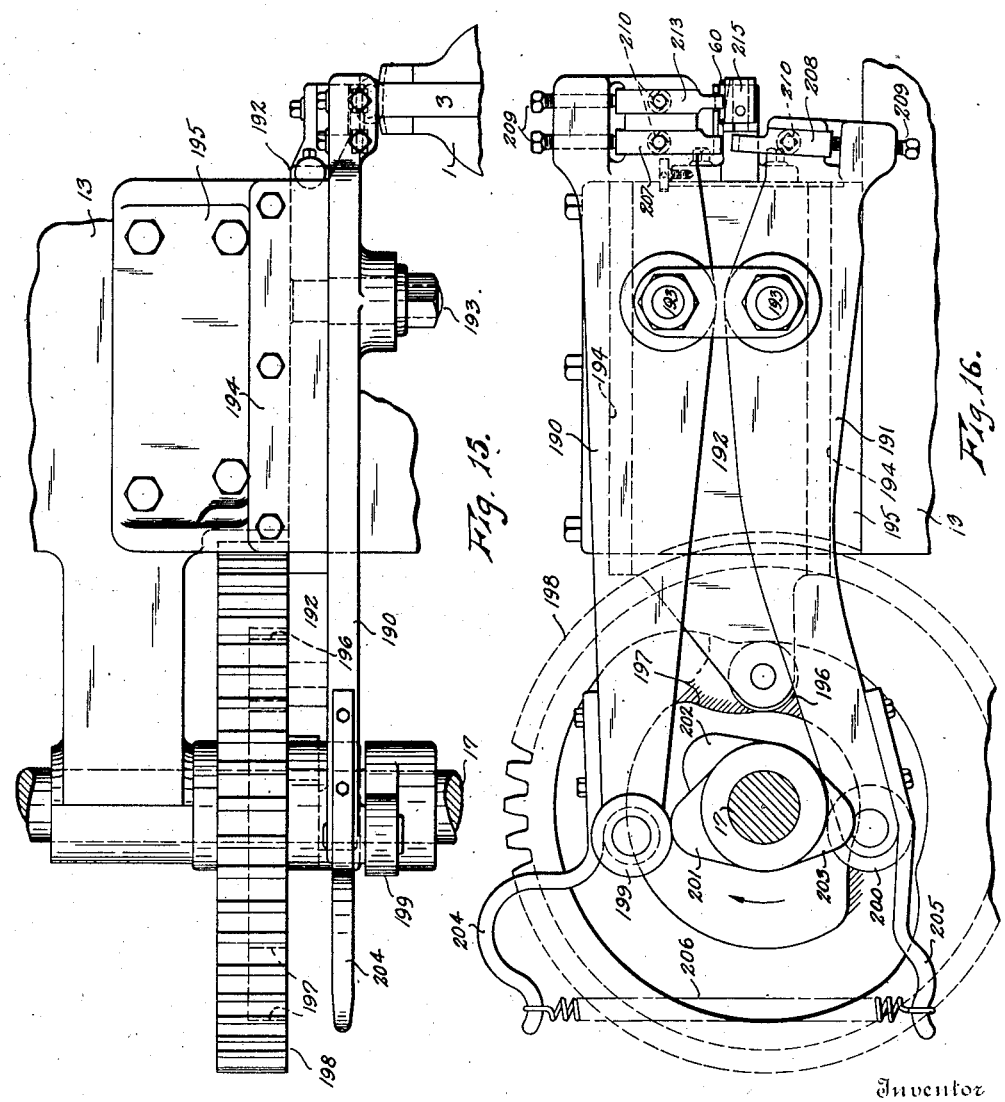

March 4, 1930. A. J. LEWIS 1,749,435
CHAIN MAKING MACHINE
Filed Nov. 17, 1924 13 Sheets-Sheet 10
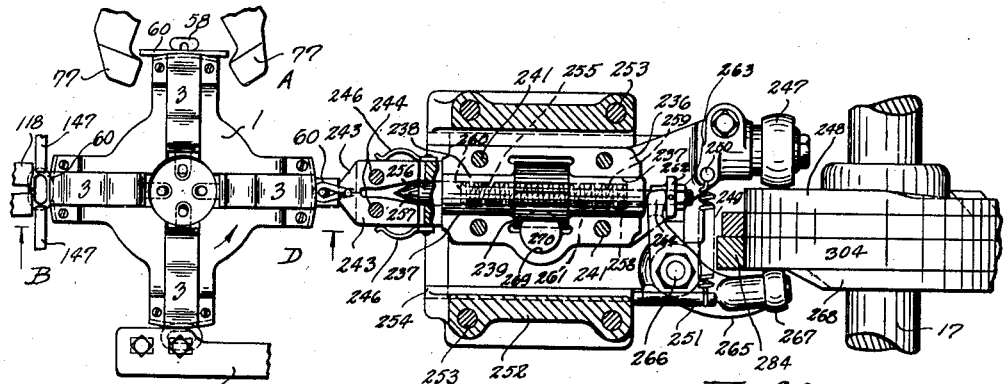
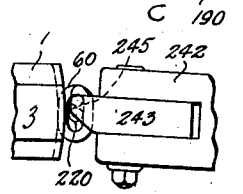
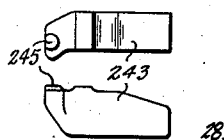
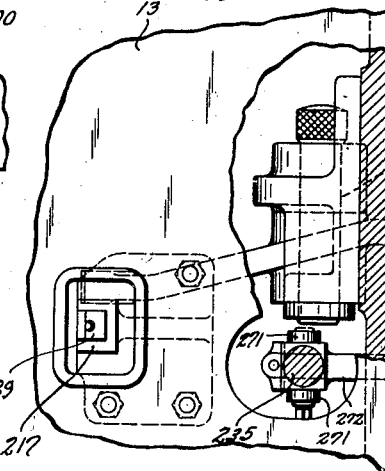
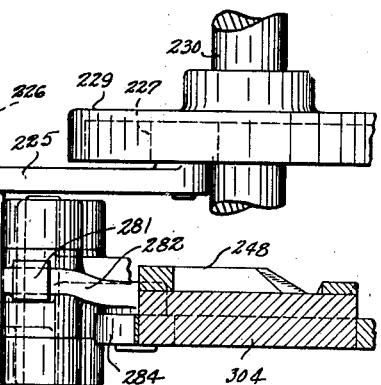
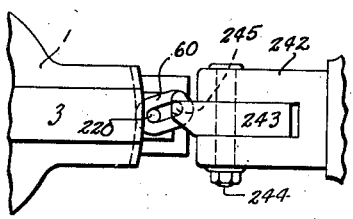
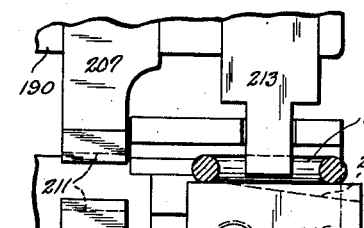
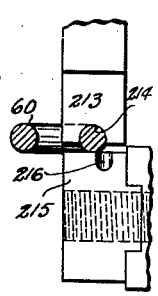
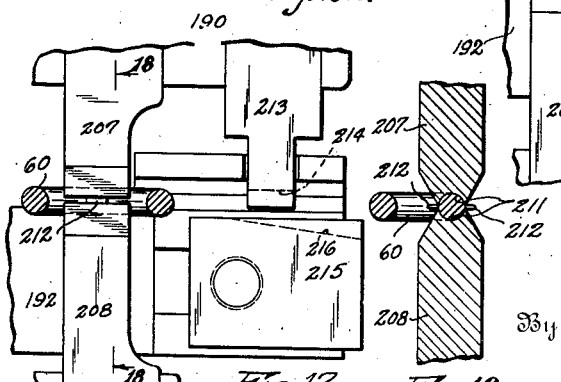
Inventor
Arthur J. Lewis
By Wooster & Davis
Attorneys

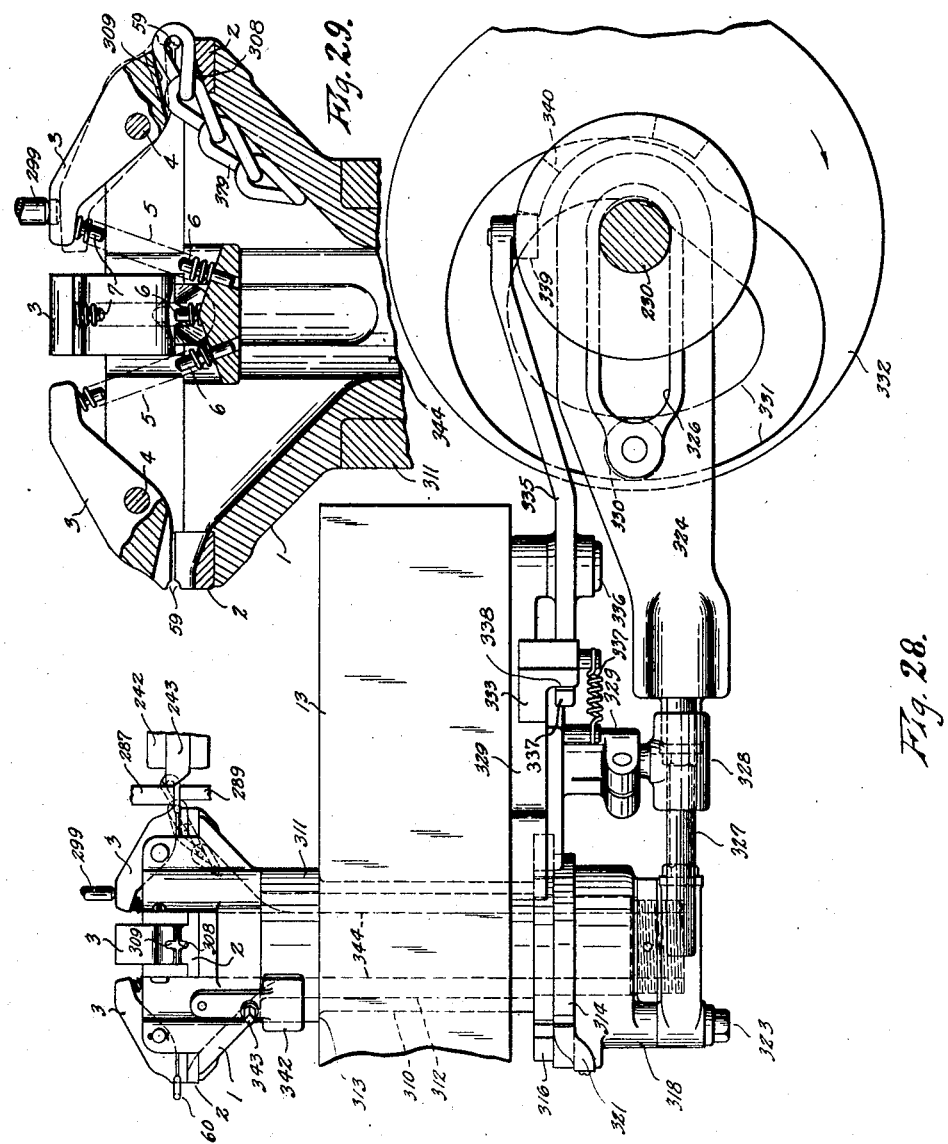

March 4, 1930.  A. J. LEWIS  1,749,435
CHAIN MAKING MACHINE
Filed Nov. 17, 1924  13 Sheets-Sheet 13
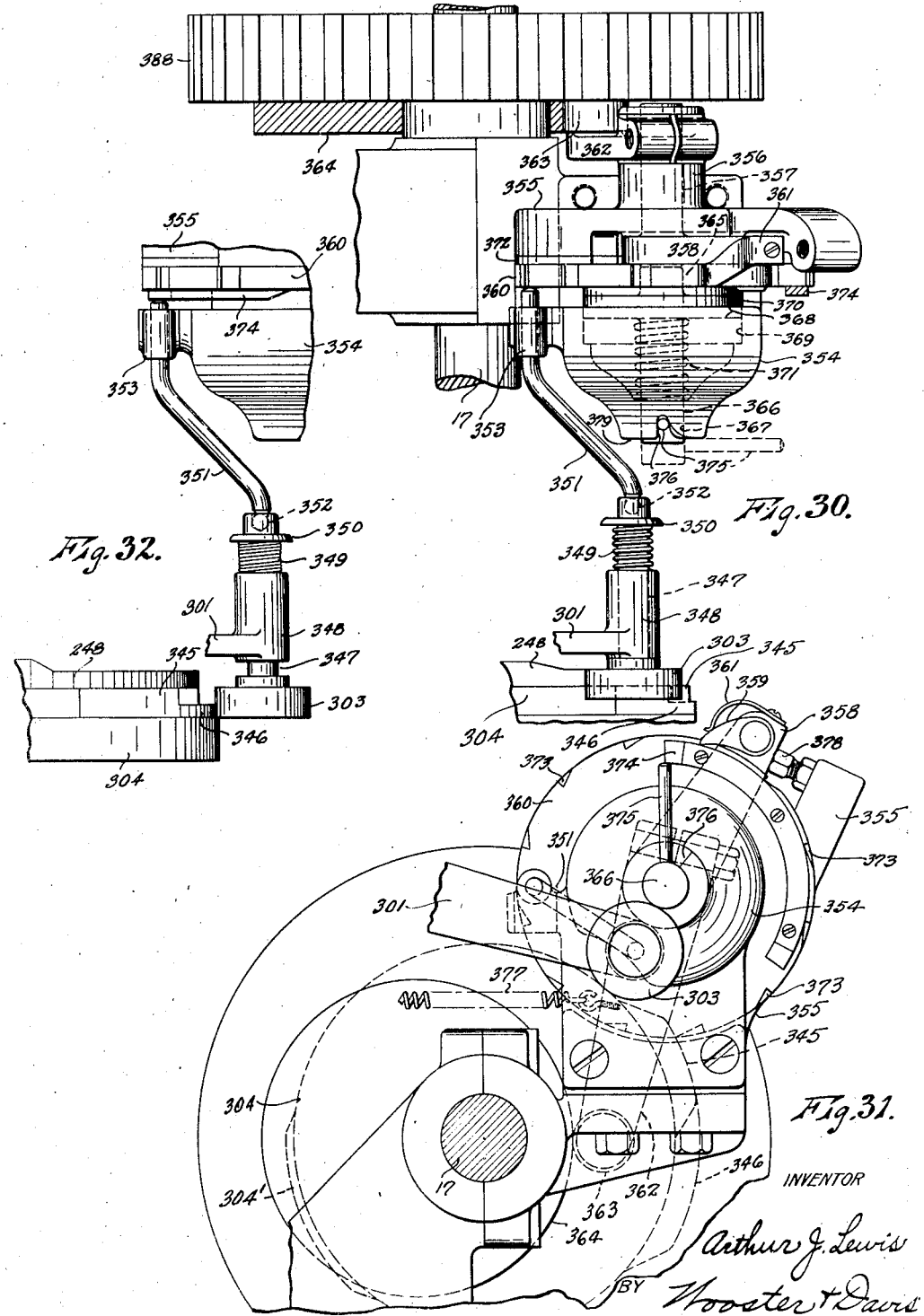

Patented Mar. 4, 1930

1,749,435

UNITED STATES PATENT OFFICE

ARTHUR J. LEWIS, OF STRATFORD, CONNECTICUT, ASSIGNOR TO THE BAIRD MACHINE COMPANY, OF BRIDGEPORT, CONNECTICUT, A CORPORATION OF CONNECTICUT

CHAIN-MAKING MACHINE

Application filed November 17, 1924. Serial No. 750,237.

This invention relates to a machine for making chains and has for an object to provide a machine which will automatically perform all the operations of cutting the stock to length, forming the link from the cut length, welding the formed link, finishing and twisting in a continuous operation.

It is also an object of the invention to provide a machine of this character in which operations are being performed on a plurality of chains at the same time so that it is not necessary to hold up one operation for another, and also so that the time required for one rotation of the machine is available for each operation.

It is a further object of the invention to provide a machine which will automatically make a chain having butt welded links.

It is a still further object of the invention to provide a machine, in which the various operations required such as forming, welding, trimming, and twisting are all being performed at the same time, although of course, on different chains, thus giving maximum speed of operation.

It is a still further object of the invention to produce an improved butt weld between the ends of the stock forming the links, which weld on the finished link is of substantially the same size as the rest of the link.

With the foregoing and other objects in view, I have devised the construction illustrated in the accompanying drawings forming a part of this specification, similar reference characters being employed throughout the various figures to indicate corresponding elements. In these drawings, Fig. 1 is a top plan view of the machine substantially complete.

Fig. 7 is a top plan view of the forming jaws at the beginning of the forming operation.

Fig. 8 is a similar view showing the forming operation partially completed.

Fig. 9 is a side elevation and bottom plan view of the forming jaws.

Fig. 11 is a front elevation thereof looking from the left of Fig. 10.

Fig. 12 is an elevation of the welding mechanism looking from the right of Fig. 10.

Fig. 13 is a side elevation of the welding mechanism looking from the right of Fig. 12.

Fig. 14 is a detail of the support for the spring at the lower part of Figs. 12 and 13.

Fig. 15 is a top plan view of the swaging and trimming mechanism.

Fig. 16 is a side elevation thereof showing the elements in the trimming position.

Fig. 17 is a side elevation of the swaging tools in swaging position.

Fig. 18 is a transverse section thereof substantially on line 18—18 of Fig. 17.

Fig. 19 is a view of the swaging and trimming tools in trimming position.

Fig. 20 is a view looking from the right of Fig. 19.

Fig. 21 is a top plan view of the jaws for twisting the link, the position being that immediately after the link is engaged by the jaws.

Fig. 22 is a plan view of the same elements shifted to the twisting position.

Fig. 23 is a plan and side elevation of the twisting jaws.

Fig. 24 is a partial plan and partial section of the twisting mechanism substantially on line 24—24 of Fig. 26.

Fig. 25 is a similar view substantially on line 25—25 of Fig. 26.

Fig. 27 is a bottom plan view of the indexing mechanism.

Fig. 28 is a side elevation thereof.

Fig. 29 is a section through the turret showing the mechanism for holding the chain links.

Fig. 30 is a plan view of the mechanism for controlling the length of the chain.

Fig. 31 is a side elevation thereof, and

Fig. 32 is a plan view of a portion of this mechanism shown in the position to release the chain.

Figure 1:
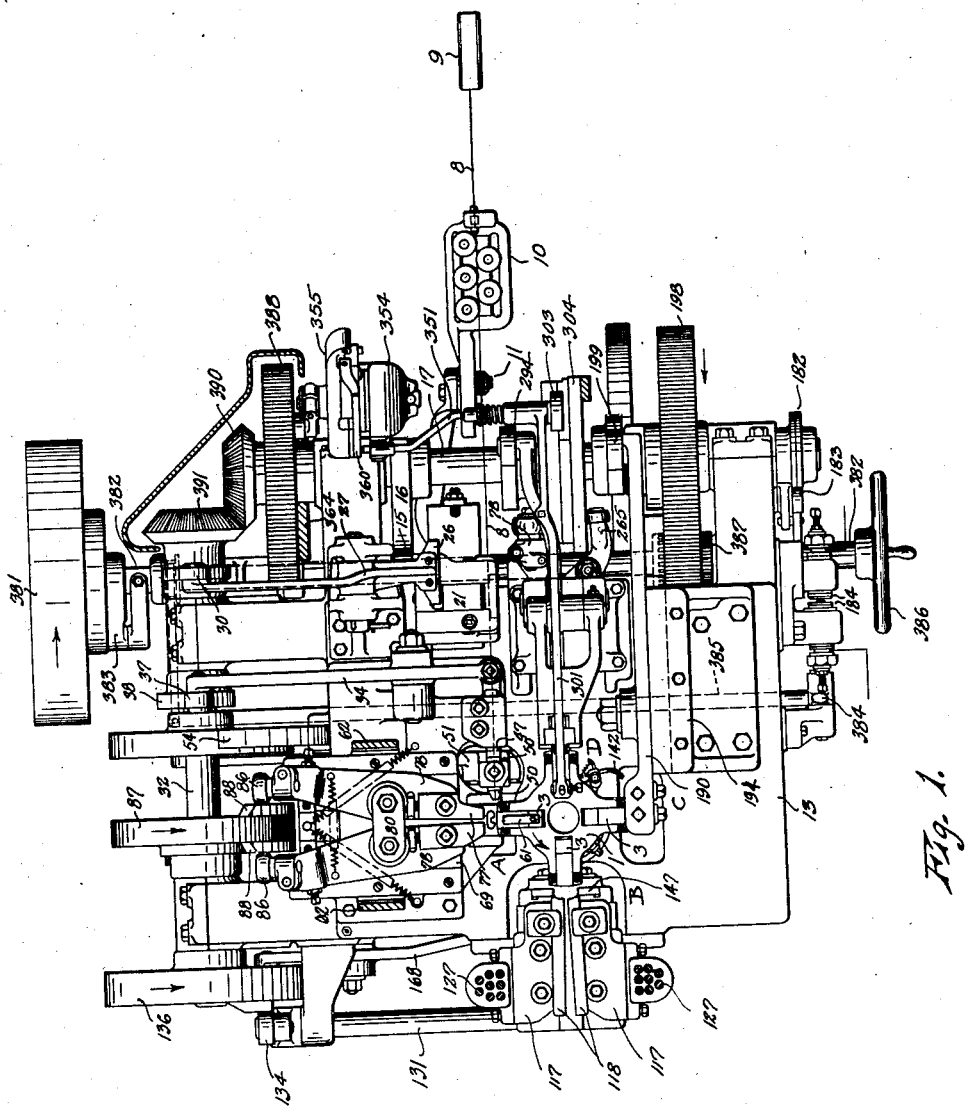

In this machine there is a rotatable support or dial 1 which carries the links which are being operated upon or which are in the process of making, and the various operations required in completing a link are performed at four working stations located about this dial, these working stations being indicated in general by the letters A, B, C and D, (Fig. 1). The dial or work support 1 is provided with a plurality of work holders, in the present case there being four sets of these holders, one for each station so that the operations performed at the respective stations may be performed simultaneously. In other words, although the various operations required for making a link are performed in their proper sequence at the different stations, these operations are all being carried on simultaneously so that there are, therefore, four chains in process of construction at the same time. Thus it is not necessary to hold up one operation for another, and the time interval of one rotation of the machine is available for each operation. This gives maximum speed of operation and maximum production of the machine without reducing the time for each operation below what is required for the proper functioning of the devices at each working station.

As indicated above the dial or work support 1 is provided with a set of work holders for each station, in the present case four and each of these sets of holders comprises a pair of jaws 2 and 3. The lower jaw 2 is stationary in the dial while the upper jaw 3 is pivoted at 4 to allow opening of the jaws for insertion of the links and their release at their completion. The gripping portions of these jaws are shaped to suit the blank from which the link is formed, and are also shaped to suit the completed link. They are normally held in clamping position by springs 5 embracing studs 6 and 7 carried by the dial 1 and the upper jaws 3 respectively.

Figure 2:
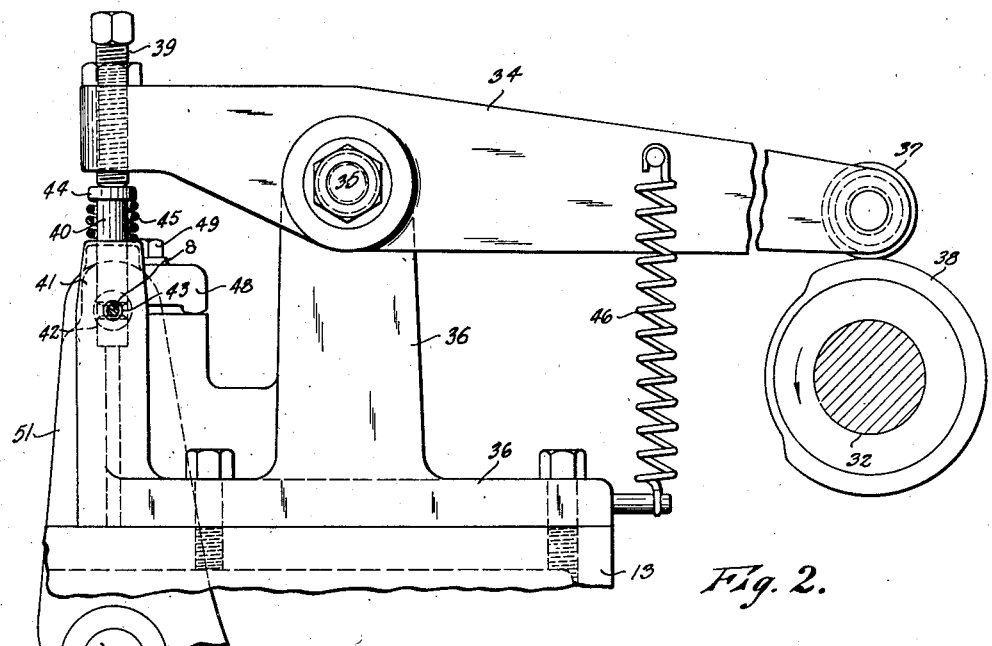
Fig. 2 is a side elevation of the clamp for holding the stock between feeding operations.
Figure 3:
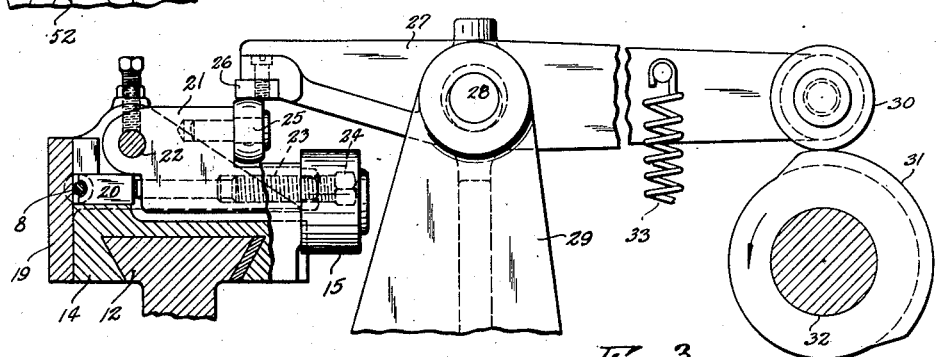
Fig. 3 is a partial side elevation and partial section of the feeding mechanism, and also a portion of the cut off mechanism.

*Cutting and feeding the blanks for the links.*—The stock or wire 8 from which the links are formed is taken from a reel 9 (Fig. 1) and passed through a straightener 10, then through a tension device 11 to the feed mechanism. This mechanism is shown in Figs. 1, 2 and 3. Mounted on a guide 12 carried by the frame 13 of the machine is a slide 14 which may be reciprocated in a direction longitudinally of the wire 8 by means of a roller 15 mounted on the slide and engaging a cam 16 mounted on the shaft 17, this roller being held against the surface of the cam by means of a suitable spring (not shown), which spring also returns the slide to the starting or original position after a feeding operation. Carried by the slide 14 is a plate 19 forming one of the jaws for clamping the wire 8, the other jaw being a slidable block 20 to engage the opposite side of the wire. A lever 21 is pivoted to the slide at 22 and carries an adjustable set screw 23 which engages the opposite end of the block 20. The position of this set screw may be adjusted to adjust the clamping effect on the wire and to adapt the device for different diameters of wire, and it is held in adjusted position by the lock nut 24. A roller 25 is carried by this lever and engages the under side of a transverse plate 26 carried by the lever 27, and which plate forms a runway for this roller during the movements of the slide 14. The lever 27 is pivoted at 28 in suitable brackets 29 carried by the frame 13 and is provided with a roller 30 at its opposite end running on a cam 31 on the shaft 32. The roller is held against the cam and the lever moved to releasing position by means of a spring 33.

Located immediately beyond this feeding device is a clamp for holding the wire while this feed mechanism is moving backwardly after a feeding operation. This clamp is shown in Figs. 1 and 2. It comprises a lever 34 pivoted at 35 to a bracket 36 carried by the frame 13 and has at its rear end a roller 37 running on a cam 38 carried by the shaft 32. At its opposite end it carries a set screw 39 engaging the top of a plunger 40 which is mounted to slide vertically in a suitable guide 41 carried by the bracket 36. In the lower end of this guide is a block 42 and between this block and the plunger is a transverse opening 43 for passage of the wire 8. The plunger 40 has an enlarged head 44, and a coil spring 45 is placed between this head and the bracket and tends to move the plunger upwardly to release the wire. The roller 37 is held against the cam by a spring 46.

Mounted immediately beyond this clamp is a guide for the wire in the form of a quill 47 (Figs. 1 and 6) which is clamped to the frame 13 by means of a block 48 and clamping screws 49. This mounting allows adjustment of the quill to proper position. At the outlet end of this quill is mounted a second quill 50 carried by a lever 51 (Figs. 1, 2, 5 and 6) pivoted to the frame at 52 and carrying a roller 53 engaging the cam 54 on the shaft 32, the roller being held against the cam by a spring 55. The quill 50 is adjustably mounted on the lever by means of a set screw 56. The backward movement of the lever, and therefore, the quill is limited by means of an adjustable set screw 57 carried by the lever to insure that the quill 50 is brought back into proper alignment with the stationary quill 47.

The operation of the feeding and cutting mechanism is as follows: At the proper time the cam 31 swings the lever 27 which through the roller 25 swings lever 21 and clamps the wire 8 between the plate 19 and the block 20. Cam 16 now advances the slide 14 a distance corresponding to the length of the wire required for one link. During this operation the clamp 34—40—42 is released and this movement of the slide pushes a length of wire through the movable cut off or holding quill 50 which during this operation is in alignment with the stationary quill 47. At the completion of this forward movement of the slide, cam 38 operates the plunger 40 to grip the wire and the cam 31 releases the clamping block 20. The feed slide 14 is now returned to its original position, the wire 8 being held stationary by the plunger 40 during this movement, and is released as soon as the wire is gripped again by the block 20 for the next feeding movement.

When the forward or feeding movement of the wire is completed, cam 54 swings the cutting off lever 51 which moves the holding quill 50 out of alignment with the quill 47, thus cutting off the wire to proper length at the contacting ends of these quills. This quill later returns to its first position in alignment with the quill 47 before the wire is again fed in, leaving a length of wire in the cut off quill 50 of the desired length for one link to be formed in the next operation. When the wire is again fed in by the slide 14 it pushes the short length of wire 60 previously cut off and left in the quill 50 forward into position between the form 58 and the transfer jaws 2 and 3 which are at the forming station A. The jaws 2 and 3 are provided with transverse grooves 59 into which the cut off length of wire is forced by the feeding operation. While the blank 60 is being fed into position between the transfer jaws and the form 58 the upper jaw 3 is released by means of a lever 61 (Fig. 5) pivoted in suitable brackets 62 carried by the frame. This lever carries an adjustable set screw 64 to engage the upper side of the inner end of the jaw 3, and at its opposite end carries a roller 65 engaging a cam 66 on the shaft 32, the roller being normally held against the cam by a spring 67. Immediately the blank is in position the lever releases the jaw 3 which grips the blank.

When the holding quill 50 is moved laterally as above described to cut the wire this movement also carries the quill and its holding means out of alignment of the transfer jaws 2 and 3 during the indexing operation of the support or dial 1.

*Link forming mechanism.*—The mechanism for forming the oval link from the straight piece of wire or blank 60 (Fig. 7) which has been cut from the continuous wire 8 and placed between the transfer jaws 2 and 3 and the form 58, as above described, is shown in Figs. 1, and 5 to 9 inclusive.

Figure 5:
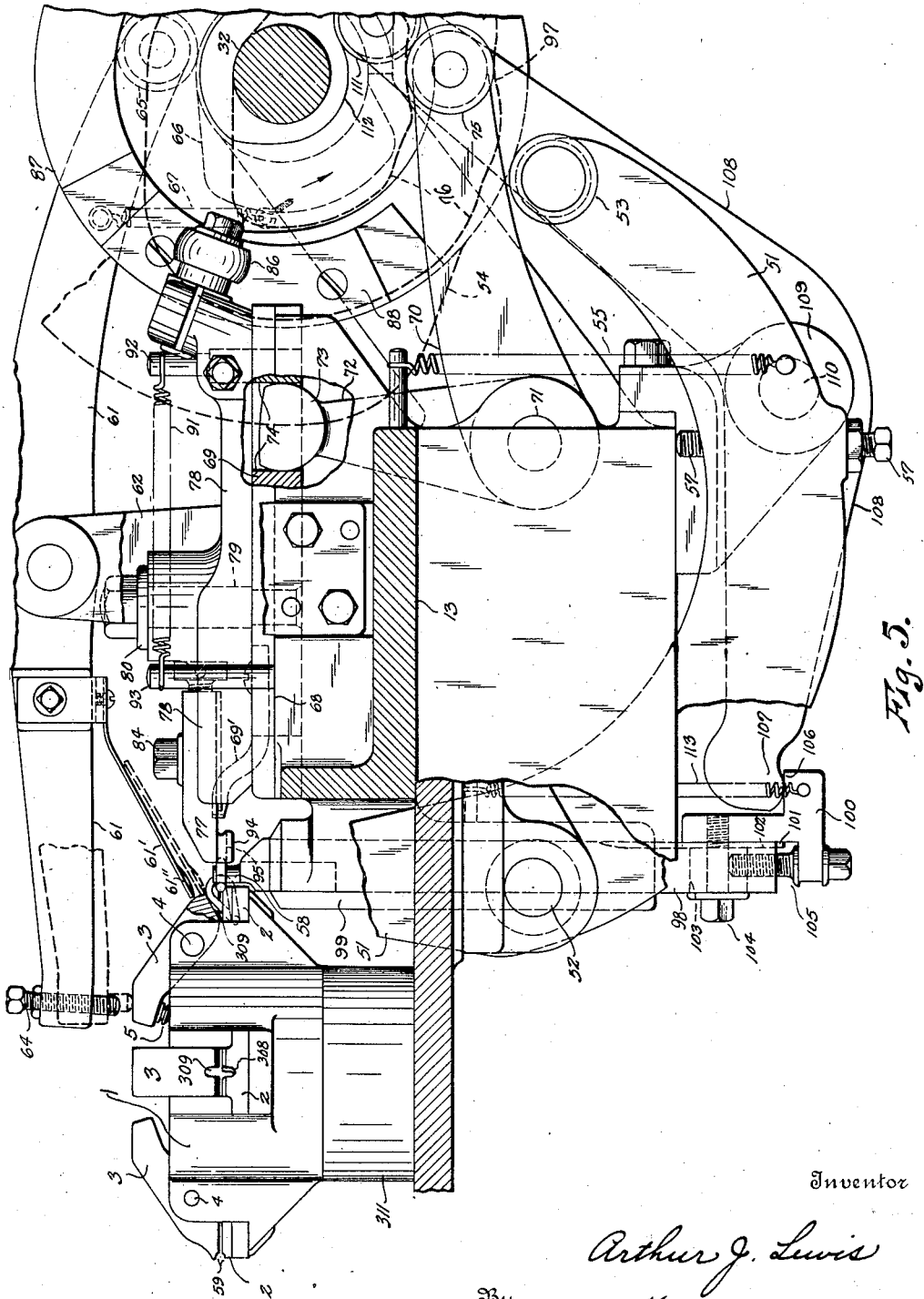
Fig. 5 is a transverse section substantially on line 5—5 of Fig. 6 showing the forming mechanism in side elevation and the position of the elements at the completion of the forming operation.

Mounted in suitable guides 68 in the bracket 36 secured to the frame 13 is a slide 69 which is mounted to reciprocate in this bracket toward and from the dial or work support 1. This movement is imparted to the slide by means of a bell crank lever 70 pivoted in the frame 71 (Fig. 5). The upright arm 72 of this bell crank lever has a rounded head 73 projecting into an opening 74 in the slide 69, and the other arm of the lever has a roller 75 running in a cam groove 76 in the cam element 54 on the shaft 32, and this cam groove reciprocates the slide in certain timing relation with the operation of forming tools 77.

These forming tools 77 are adjustably mounted on a pair of tongs or levers 78 pivotally mounted on the slide 69. The pivot bolts for these tongs or levers is shown at 79 and they are preferably tied together by a link to give them greater strength. The tools 77 may be mounted on the tongs in various ways, but in the present instance the tongs are provided with grooves 81 in their upper surfaces in which a guide rib 82 on the under sides of the tools fit to keep them from turning, and they are each provided with an elongated slot 83 through which the clamping screw 84 extends. Adjustable stop screws 85 are threaded from the rear end of these tools and engages the screw 84 to determine the position of the tools, after which they are clamped in position by tightening the screws 84. At their opposite ends the tongs carry rollers 86 engaging the opposite sides of the cam element 87 and the side cams 88 carried on the opposite sides of this element. A spring 89 is connected at its opposite ends to pins 90 carried by the tongs and hold these rollers against the cams, and also tends to separate the forming tools 77. A pair of springs 91 connected to a pin 92 on the slide 69 and other pins 93 on the bracket 36 tends to move the slide toward the dial. At their free ends the tools 77 are formed with similarly shaped projections 94 extending downwardly from their lower sides, and which projections have grooves 95 in the side walls thereof to engage the free ends of the blank 60 and bend them about the form 58.

Figure 6:
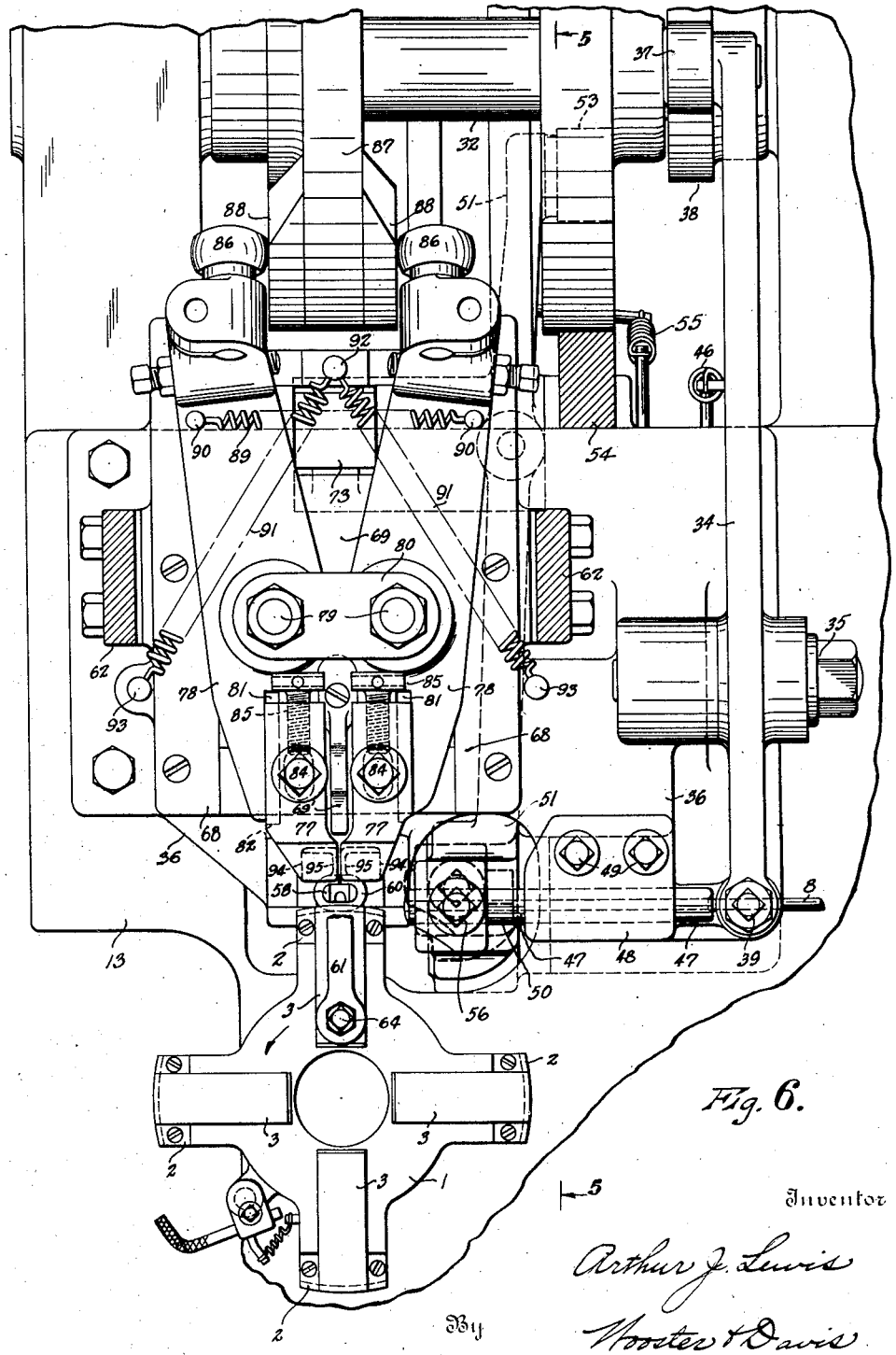
Fig. 6 is a top plan view of the forming mechanism, the positions corresponding to Fig. 5.

The operation of this forming mechanism is as follows: When the blank 60 is fed into position between the transfer jaws 2 and 3 and form 58 as above described, the forming tools 77 are separated and advanced to a position where the projections 94 are on the forward side of the free ends of the blank 60 as shown in Fig. 7. These tools are moved toward each other by the action of side cams 88 on the rollers 86 carried by the tongs until the blank rests in the portion of the groove 95 on the rear side 96 of the projections 94, and the slide 69 is given a backward movement away from the dial, or to the right as viewed in Figs. 5, 6, 7 and 8, by action of the cam groove 76 acting on the roller 75 carried by the lever 70, and bends the free ends of the blank 60 about the form 58 to substantially U-shape as shown in Fig. 8. As the slide continues to move backwardly the tools are further brought together to bend the free ends of the blank about the rear side of the form 58, and then the slide 69 is advanced toward the dial to set these free ends against the rear side of the form as shown in Figs. 5 and 6. This slight forward movement is imparted to the slide by the rise 97 in the cam groove 76. The tools 77 are then backed away from the formed link under action of the cam 76 and the form 58 is drawn downwardly out of position in the link to allow the dial to index and move this formed link to the welding position B. The form 58 is mounted on a slide 98 vertically reciprocable in a guide 99 in the bracket 36. Secured to the lower end of the slide 98 is an adjustable block 100 which is provided with a rib 101 projecting into a groove 102 in the rear of the slide, and the slide has an elongated slot 103 for passage of a clamping screw 104. An adjusting screw 105 is carried by the block and threaded into the lower end of the slide for adjusting the position of the block on the slide, and the block is provided with a rearwardly projecting shoulder 106 engaged by the rounded end 107 of a lever 108 pivoted to a bracket 109 and 110, and provided with a roller 111 on its opposite end running in a cam groove 112 in the cam element 87 on the shaft 32. This cam is constructed and arranged to draw the form downwardy away from the formed link at the completion of the forming operation to allow the dial to index, and to then allow the form to move back to the forming position after the dial is indexed for the forming operation on the next link. The form is moved to this position under the action of springs 113.

*Welding.*—After the link has been formed as above described the dial 1 is rotated a one-quarter revolution to transfer the formed link to the welding position B. The mechanism for indexing this dial or work support is shown in Figs. 27 and 28 and will be more fully described later. This indexing mechanism is, of course, operated in certain timing relation with the forming mechanism, the welding mechanism, the swaging and trimming mechanism, and the twisting mechanism to transfer the links to the various working stations in succession, each movement of the dial being a quarter revolution as there are four stations in the present case.

Figure 10:
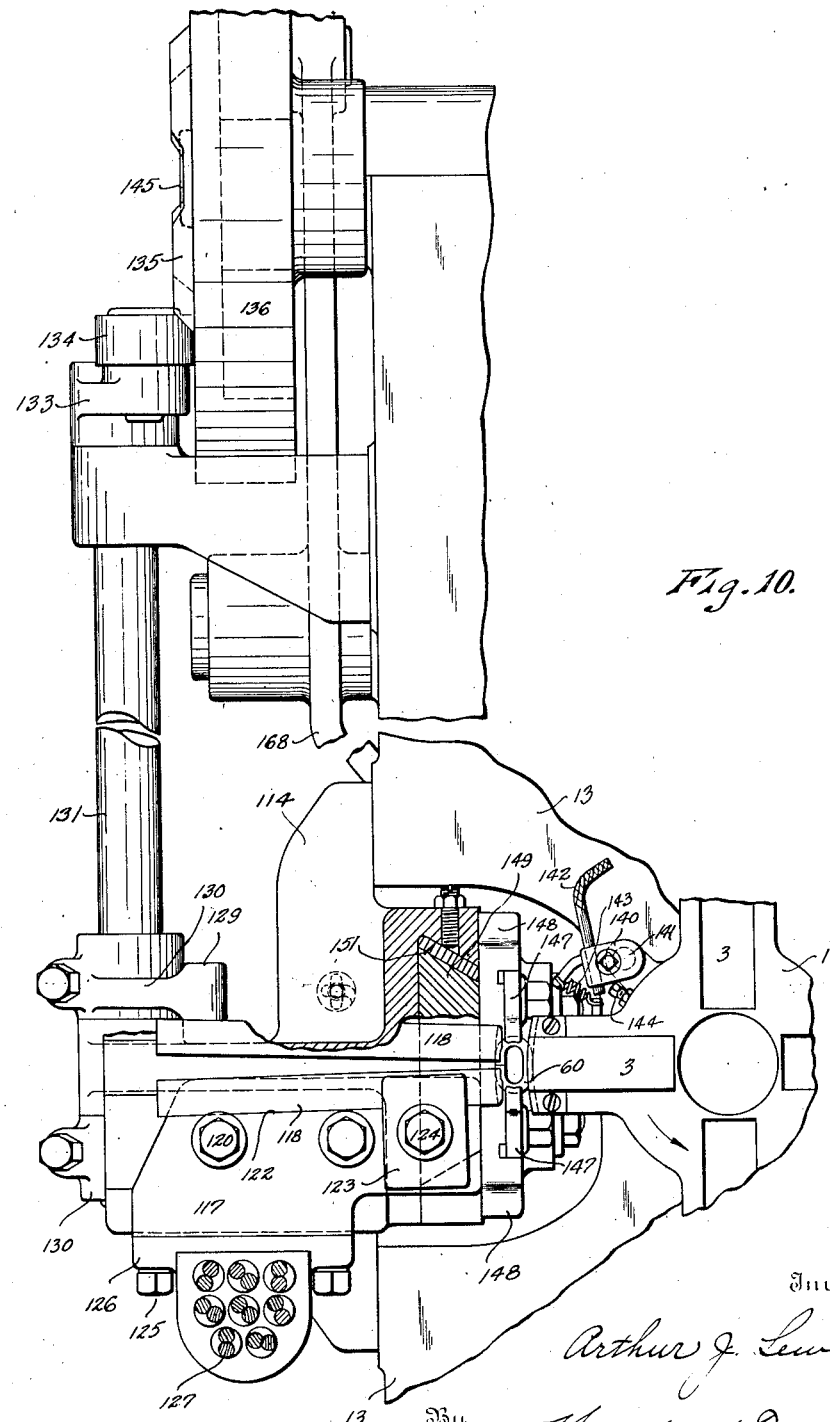
Fig. 10 is a top plan view of the welding mechanism.

The welding mechanism is shown in Figs. 1 and 10 to 14 inclusive. Secured to the frame 13 of the machine is a bracket 114 which bracket carries the welding mechanism. On the upper side of this bracket are guides 115 for slides 116 carrying the electrode holders 117 in which the electrodes 118 are mounted. The electrode holders are insulated from the slide by suitable insulation, such as the fibre plate 119. These holders are also insulated from their securing screws 120 by similar fibre washers 121. Attention is particularly directed to the fact that the two electrodes 118 are mounted on separate slides 116 and that these two slides are entirely independent of each other. The holders 117 are provided with grooves 122 in which the electrodes 118 are seated and are clamped in position by suitable clamps 123 and clamping screws 124. This method of mounting allows for independent adjustment of the electrodes. Secured to the holders, as by screws 125, are connecting blocks 126 connected with conducting cables 127 leading from a transformer, not shown, it being understood that these cables conduct the welding current to the holders and the electrodes carried thereby. Secured to the holders, and projecting downwardly from the under side thereof, are studs 128 which are engaged by the rounded heads 129 of lever arms 130. These lever arms are mounted on a shaft 131 by suitable clamping screws 132, and also secured to this shaft is an arm 133 carrying a roller 134 which is operated by the cam 135 carried by the cam element 136 on the shaft 32. It will be apparent that as the cam element 136 rotates the cam 135 will swing the lever 133 outwardly and through the lever arms 130 will move the holders and the electrodes 118 backwardly away from the link, indicated at 60, at the completion of the welding operation, but as the roller 134 runs off the cam 135 it will allow the springs 137, one for each slide, to advance the slides and the electrodes to the welding position in engagement with the sides of the link on opposite sides of the free butting ends, as shown in Fig. 10. The springs 137 are connected at their opposite ends to hooks 138 carried by the bracket 14 and pins 139 carried by the studs 128. The electrode holders 117 may be provided with passages for cooling fluid, as water, but this cooling means is not shown as it would tend to unduly complicate the drawings.

It will thus be apparent that although the slides carrying the electrodes are retracted away from the link or the welding position by the same mechanism they are moved forwardly to the welding position entirely independently of each other. This arrangement is important in giving perfect welds. One of the difficulties encountered in welding machines as heretofore constructed is that there are some poor welds which cannot be depended upon, and the reason they secure some poor welds is that they do not always secure proper contact between the electrodes and the element to be welded. If both of the contacts or electrodes are on the same slide and there is a variation in the chain links, a proper contact may not be secured, and as the voltage is very low it is necessary to secure a perfect contact in order to get sufficient heat for the weld. As in the present construction these contacts or electrodes are mounted on separate slides which are moved independently of each other to contact with the link, as above described, perfect contacts are secured between these electrodes at all times in spite of variations in the links.

Figure 4:
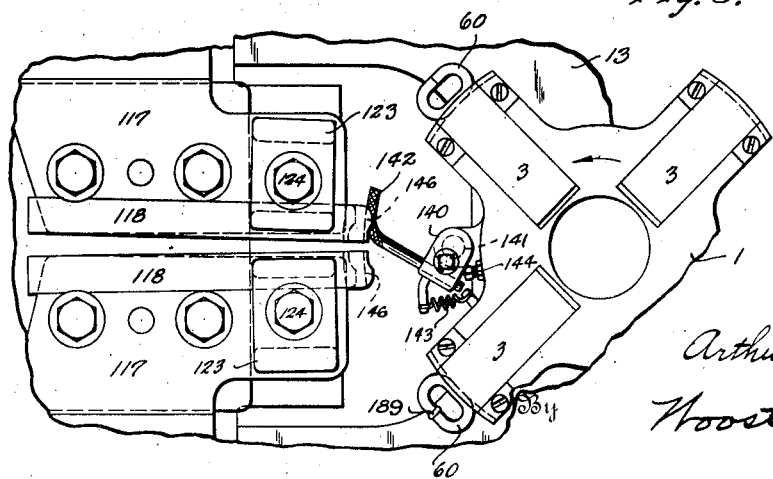
Fig. 4 is a top plan view showing the means for cleaning the electrodes.

Another reason why some poor welds are secured is that a poor contact between the electrodes and the link is caused by the lodging of some foreign object, such as dirt or scale on the surfaces of the electrodes which engage the link. If such dirt or scale rests between the contacts and the links the electrical contact is so poor that the butting ends of the link will not weld. I have, therefore, provided in the present machine means for cleaning the contact surfaces of the electrodes. To accomplish this result I find that the most convenient means of cleaning these electrodes is to mount a cleaning device on the dial 1 which will be drawn over the contacting surfaces of the electrodes as the dial indexes. In the present case a holder 140 is pivoted to the dial at 141 and this holder carries a file 142. A spring 143 tends to rotate the holder about its pivot and move the file outwardly. This movement is limited by the adjustable stop screw 144 carried by the dial. When a welding operation is completed the electrodes are moved backwardly away from the link by the cam 135 as above described and the dial is then indexed by the indexing mechanism. As the file passes by the electrodes the notch 145 (Figs. 10 and 11) allows the slides and the electrodes to advance to a position where these electrodes are engaged by the file, as shown in Fig. 4, after which operation the electrodes are again moved backwardly to their retracted position by the cam to allow the next link to be brought into the proper welding position. It will be apparent that as the file is drawn through the contacting grooves 146 any glase, dirt, scale or other foreign matter which may be in these grooves will be removed and the electrodes kept clean, so that when they are brought into engagement with the link a perfect contact will be secured. This cleaning element may be a file, brush, scraper or any device which will perform this cleaning operation. It has been found in practice that one cleaning device on the dial is sufficient to keep the electrodes properly cleaned, altho it will be apparent that as there are four links being operated upon the contacts will be cleaned only after every fourth welding operation. If, however, it is found desirable to clean the electrodes oftener, one or more additional cleaning devices may be mounted on the dial.

After the contacts or electrodes 118 engage the opposite sides of the butt joint in the link, jaws come up from below the link and continuously press the butting ends of the link together with a yielding pressure so as to secure a proper weld. These jaws are shown as tools 147 carried by levers 148 pivoted to a vertically movable slide 149 at 150, this slide being mounted to reciprocate in guides 151 carried by the bracket 114. The free ends of these tools are preferably provided with recesses 152 between which the opposite ends of the link to be welded may be seated. Secured to the lower end of the slide 149 is a plate 153 and coil springs 154 are secured to this plate and suitable hooks 155 carried by the bracket. These springs tend to hold the slide 149 and the jaws carried thereby in elevated position or in position to engage the link, as shown in Figs. 12 and 13. This upward movement is limited by a stop screw 156 adjustably carried by the plate 153, the end of this screw engaging the bottom of the bracket.

The slide 149 is also provided with guides for a slide 157 which is adapted for movement relative to the slide 149 and carries a wedge 158. This wedge is provided with an elongated slot 159 through which a clamping screw 160 extends and which is threaded into the slide. Threaded into the lower end of the wedge is an adjusting screw 161 mounted in a fork 162 carried by the slide 157. The wedge is provided with an upright rib 163 fitting in a groove in the slide to prevent the wedge turning on the slide. The position of the wedge on the slide may be determined by the adjusting screw 161 and clamped in this position by the screw 160.

The lower portion of the slide 157 is provided with a cylindrical bore 164 in which is mounted a plunger 165 and this plunger has a transverse opening 166 to receive the rounded head 167 of a lever 168. This lever is pivoted to the frame at 169 and carries a roller 170 running in a cam groove 171 in the cam element 136. If desired a wearing plate 172 may be mounted in the lower part of the opening 166 to be engaged by the head 167. The lower portion of the plunger 165 is reduced as shown at 173 and passes through an opening in a cap 174 secured to the lower end of the slide 157 by any suitable means such as screws 175. The reduced portion 173 of the plunger is threaded at its lower end, as shown in Fig. 14, to receive the washer 176, and nut 177 and lock nut 178. This portion of the plunger is embraced by a coil spring 179 engaging at its opposite ends against the cap 174 and the washer 176.

After the formed link reaches the welding position, by indexing of the dial, the cam groove 171 allows the head 167 of lever 168 to rise, and the slide 149 carrying the tools 147 moves upwardly under the action of spring 154 until the recesses 152 are in alignment with the opposite sides of the link, this position being determined by the stop screw 156. Continued upward movement of the head 167 of the lever raises the plunger 165 and compresses the spring 179. This spring pressure then moves the wedge 158 upwardly causing the inclined sides 180 to engage the rollers 181 carried by the levers 148 and separates them to clamp the tools or jaws 147 against the opposite ends of the link. At the same time the electrodes 118 are brought into contact with the free ends of the link on opposite sides of the butt joint under the action of the springs 137. After these contacts are completed the adjustable cam 182 (Fig. 1) on shaft 17 operating through roller 183 closes the circuit through contacts 184, and the welding operation is performed. During this welding operation the jaws 147 press the opposite sides of the link together under the pressure of spring 179 so that while the weld is being made the link is closed together at the joint, thus giving plenty of metal at the welding point. After the welding operation is completed the circuit is broken by separation of the contacts 184 through action of the cam 182, and then the electrodes 118 and jaws 147 are removed from engagement with the link and also out of its path of movement to allow the dial to index to carry the welded link to the next station C. The jaws 147 are removed from the link under the action of cam 171 on lever 168. After the welding operation is completed the head 167 of this lever is lowered under the action of the cam until the shoulder 185 on the plunger 165 engages the cap 174. Further movement of the lever then moves the wedge 158 downwardly and allows the spring 186 connecting the levers 148 to spread the jaws 147 and release the link. Continued downward movement of the plunger and slide 157 will bring the nut 187 on screw 188 secured to the top of the lower slide 157 against the top of slide 149 and will move this slide with the jaws downwardly out of alignment with the link and allow the dial to index to carry the link to the next position.

*Swaging and trimming.*—The finished welded joint as it leaves the welding position is somewhat larger in diameter than the rest of the link. In other words, there is a bulge left at the welded joint as indicated at 189 (Fig. 4). This bulge is removed at the next station C so that the diameter of the stock of the finished link will be substantially uniform throughout. This finishing is performed by swaging and trimming the welded joint. The swaging and trimming mechanism is shown in Figs. 1 and 15 to 20 inclusive. This swaging and trimming mechanism comprises a pair of levers 190 and 191 pivoted on a horizontally movable slide 192 by the studs 193, this slide being mounted in suitable guides 194 in a bracket 195 secured to the frame 13. The slide carries a roller 196 running in a cam groove 197 formed in the combined cam element and gear 198 on shaft 17. The levers 190 and 191 carry rollers 199 and 200 respectively which are arranged to engage cams 201, 202 and 203 mounted on this shaft. A pair of fingers 204 and 205 are secured to the levers and are connected by a spring 206 which tends to bring the arms of the levers together and hold the rollers in contact with their cams.

At the opposite sides of the pivots 193 these levers carry the tools for swaging and trimming the welded joint. In Figs. 15, 16, 19 and 20 the elements are shown in the trimming position, while in Figs. 17 and 18 they are shown in the swaging position. Carried by the two levers 190 and 191 are the upper and lower swaging tools 207 and 208 respectively, these tools being adjustably mounted on the levers by the screws 209 and 210. The adjacent end of the tools are practically the same shape with substantially semi-circular grooves 211, as shown in Fig. 18. The slide 192 is moved forwardly, or to the right as viewed in Fig. 16, by the cam groove 197 bringing the tools 207 and 208 in alignment with the weld in the link 60, and the tools are then brought together on opposite sides of the link by the cams 202 and 203 engaging the rollers 200 and 199 respectively. This action swages the welded joint reducing it to practically the same size as the rest of the link but leaves fins or flashings 212 on opposite sides of the joint, as shown in Figs. 17 and 18. In order to finish the link these fins or flashings are then trimmed off.

As soon as the swaging operation is completed the tools 207 and 208 separate, and slide 192 is moved backwardly, or to the left as viewed in Figs. 15 and 16, by the cam groove 197, and bringing the trimming tool 213 which is carried by the upper lever 190 into alignment with the welded joint. The cam 201 then engages the roller 199 and moves the tool 213 downwardly to cut off the fins or flashings 212 as indicated in Figs. 19 and 20. The lower end of this tool is provided with a groove 214 which is somewhat deeper than the radius of the link so that the sharp edges on the opposite side of this tool will trim off the flashings during this operation. The link is supported on its under side during the trimming operation by an anvil 215 mounted on the slide 192. As this anvil is mounted on the slide 192 which carries the lever 190 carrying the trimming tool 213 it is always located under this trimming tool and moves with it to and from the trimming position as the slide 192 is shifted. It will, of course, be understood that during these operations the link is held stationary by jaws 2 and 3 on the dial 1. This anvil is provided with a slot 216 for removal of the chips which are trimmed off after the trimming operation is completed. After the trimming operation the trimming tool is moved upwardly away from the link and the next indexing operation of the dial transfers the trimmed link to the twisting position D.

Figure 26:
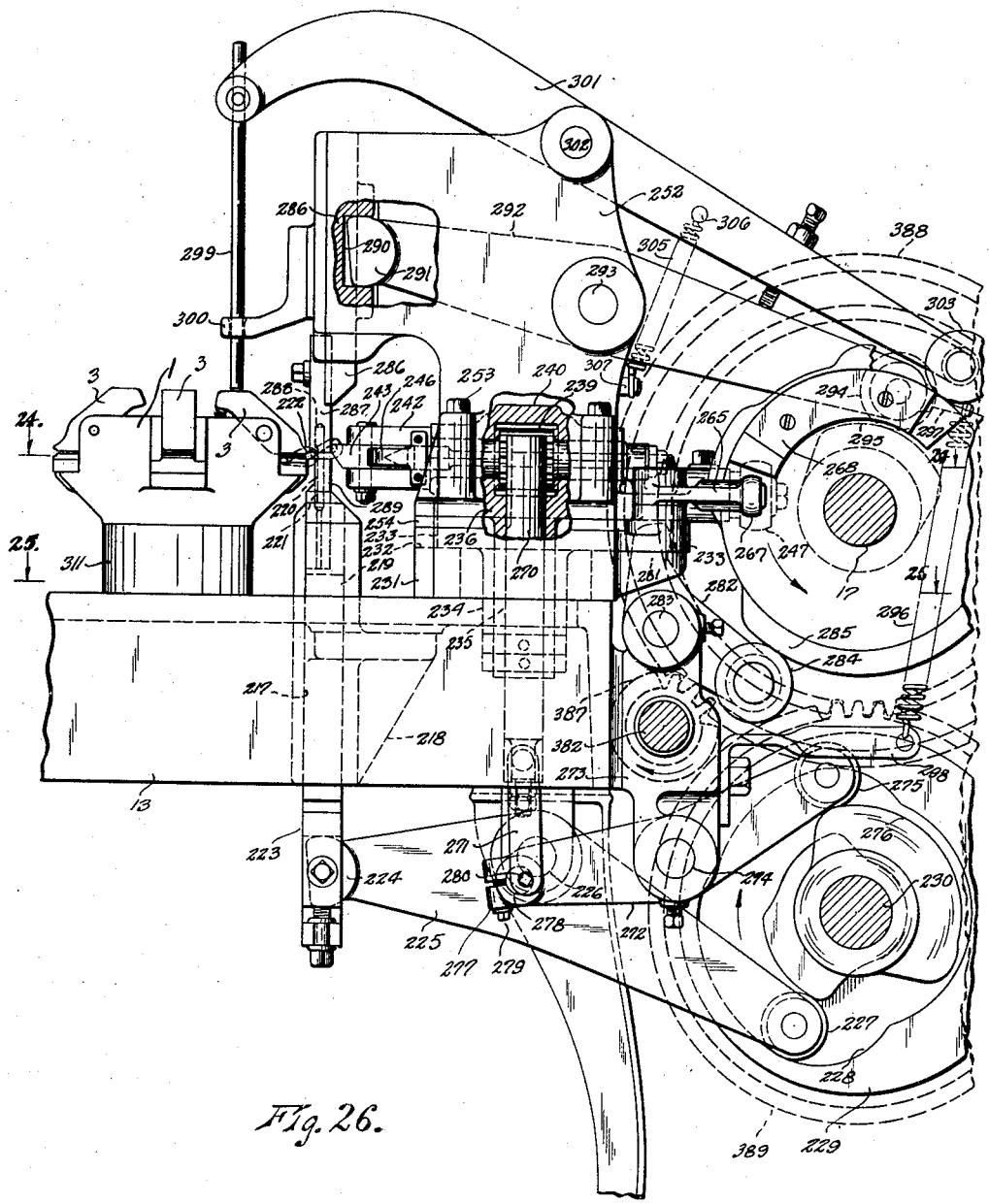
Fig. 26 is a side elevation of the twisting mechanism certain elements being broken away to more clearly show the construction, and the elements being in the position they occupy at the completion of the twisting operation.

*Twisting.*—The link twisting mechanism at station D is illustrated in Figs. 1 and 21 to 26 inclusive. Mounted in vertical guides 217 in a bracket 218 secured to the frame 13 is a slide 219 carrying a pin 220, which pin is provided with a groove 221 on the forward side thereof to receive the upright portion of a previously formed link 222, as shown in Fig. 26. At its lower end the slide 219 carries an adjustable block 223 which is notched to receive the rounded head 224 of a lever 225 pivoted to the frame at 226. The opposite end of the lever carries a roller 227 running in a cam groove 228 in the cam element 229 on the shaft 230.

A bracket 231 is mounted on the top of the frame 13 and is provided with guides 232 for a slide 233 which is reciprocable toward and from the dial or work support 1. This slide is provided with a boss 234 on its under side forming an upright bearing for a pivot stud 235 on a lever 236. This lever has spaced bearings 237 for a spindle 238, which spindle intermediate these bearings is provided with a spur gear 239. This spindle is maintained in the bearings 237 by a cam 240 held in place by the screws 241, and at its forward end the spindle 238 is provided with a forked head 242 carrying the twisting jaws 243. There are two of these jaws pivoted in this head at 244, and at their free outer ends are shaped to grip the formed link 60 substantially as shown in Fig. 23 with a lug 245 projecting inwardly from each jaw toward the other jaw and adapted to extend into the opening through the link when the jaws grip this link, as shown in Figs. 21 and 22. Springs 246 carried by the head 242 press against the jaws and tend to separate them. The lever 236 carries at its opposite end a roller 247 engaging a cam 248 mounted on the shaft 17, and a spring 249 connected at its opposite ends to a pin 250 on the lever and a pin 251 on the bracket 252, which bracket is also secured to the frame on top of the bracket 231 as by means of the screws 253. In the present construction these screws also fasten the bracket 231 to the frame, and between them there are caps or plates 254 to keep the slide 233 in its guides.

The spindle 238 is provided with a longitudinal passage 255 in which is mounted a wedge element 256 having a conical end 257 adapted to engage the inner ends of the twisting jaws 243. The inner end of the passage 255 is reduced to form a shoulder 258 and the wedge element is reduced as shown at 259 to pass through this reduced portion of the passage and form a shoulder 260. A coil spring 261 embraces this reduced portion and reacts at its opposite ends against the shoulders 258 and 260 and tends to advance the wedge element toward the twisting jaws to cause the conical end 257 to engage these jaws and clamp them on the link. At its inner end the portion 259 is threaded to receive an adjustable block 262 which is held in adjusted position by the lock nut 263. This block has a flange which is engaged by a fork 264 on a lever 265 pivoted to the slide 233 by the bolt 266. This lever carries at its other end a roller 267 running on the cam 268 carried by the shaft 17 which, in certain timing relation with the operation of the other devices, swings this lever on its pivot to retract the wedge 256 away from the jaws 243 and allow them to separate to release the link.

The upright pivot stud 235 on the lever 236 is provided with a passage 269 in which a rack 270 is mounted to reciprocate, this rack having gear teeth engaging the spur gear or pinion 239 so that as this rack is reciprocated up and down it will rotate spindle 238 and with it the twisting jaws to twist the link or move the jaws back to the position to engage a new link as will presently be described. The rack 270 is connected at its lower end by means of links 271 to a lever 272 pivoted in a bracket 273 at 274, this bracket being secured to the frame 13, and at its opposite end the lever carries a roller 275 running on a cam 276 carried by the shaft 230. The other end of the lever is split as shown at 277 to receive an eccentric pin 278, the body portion of the pin being clamped in the split bearing by the screw 279. Pivot studs 280 carried by this pin are arranged eccentric to the body portion and project through the links 271. By adjusting this eccentric pin the connection between the lever 272 and the rack 270 may be adjusted.

The slide 233 is provided with a recess to receive the head 281 of a lever 282, which lever is pivoted in the bracket 273 at 283 and carries a roller 284 at its opposite end running on a cam 285 on the shaft 17. This cam retracts the slide and the mechanism carried thereby away from the dial or turret in certain timing relation with the operation of the other devices.

Mounted to slide in suitable guides in the bracket 252 there is an upright slide 286 upon which is mounted a tool 287 having an opening 288 in its lower end to receive the upper end of pin 220 to strengthen the pin, and the lower end of this tool also clamps a portion of the link to be twisted against the top of the lower tool 289 which carries the pin to securely hold the link during the twisting operation. The slide 286 is provided with a notch or recess 290 to receive the rounded head 291 of a lever 292 pivoted in the bracket 252 at 293. This lever carries at its opposite end a roller 294 running on a cam 295 carried by the shaft 17. A spring 296 is connected at its opposite ends to a pin 297 and a bracket 298 secured to the bracket 273 and tends to hold the roller against its cam and also to raise the slide 286.

The twisting operation is performed as follows: When the welded link 60 reaches the twisting position station D under the indexing movement of the dial or turret 1, it is held by the transfer jaws 2 and 3 in substantially the position shown in Fig. 21. The twisting jaws 243 are in substantially the position shown in this figure, standing forward and to one side as indicated. The pin 220 is moved upwardly by the cam 228 so that the pin just enters the link. The jaws 243 now grasp one end of the link under the action of the wedge 256 which is advanced by the spring 261, the cam 268 allowing this operation, and as the link is clamped by the twisting jaws the transfer jaws 2 and 3 are released by a downward movement of the rod 299 slidable in a guide 300 secured to the bracket 252. The lower end of this rod engages the upper surface of the jaw 3 and is connected at its upper end to a lever 301 pivoted in the bracket 252 at 302 and carries a roller 303 which is engaged by cam 304' on cam element 304 mounted on the shaft 17 to cause this release of jaw 3. The lever is swung in the opposite direction and the rod raised to its upper position by a spring 305 connected to the lever at 306 and to a pin 307 on the bracket 252. The twisting jaws 243 now swing the link 60 about the pin 220 as a pivot an amount somewhat less than ninety degrees to substantially the position shown in Fig. 22. This movement is caused by the cam 285 moving the slide 233 away from the turret or dial 1, and the cam 248 swinging the lever 236 about its pivot 235, the movement being counter-clockwise as viewed in Fig. 24. This moves the jaws 243 in toward the center line of the turret or dial. The top and bottom tools 287 and 289 now close together under the action of cams 295 and 228 to hold the link during the twisting operation. When these tools have closed on the link the spindle 238 is turned a partial revolution by a downward movement of the rack 270 under the action of lever 272 and the cam 276 thus twisting the link to the desired shape. The elements are shown in this position at the completion of the twisting operation in Figs. 24 and 26. The twisting action is then relieved slightly by the cam 276 and the upper and lower holding tools 287 and 289 are opened their full distance under the action of their respective cams, which also drops pin 220 from the link. The twisting jaws 243, spindle 238, lever 236 and slide 233 are now moved forwardly or are advanced toward the turret 1 to move the upright portion of the twisted link into the upright grooves 308 and 309 in the transfer jaws 2 and 3, this movement being permitted under the action of cam 285 and the upper jaw 3 is released by a cam on element 304 as will presently be described, causing it to grip the link. The cam 268 now retracts the wedge 256 allowing the twisting jaws to open and release the link. The slide 233 carrying these jaws is then moved backwardly away from the turret to allow it to index. If this link happens to be the last link in the length of the chain the transfer jaw 3 is not allowed to close but is held open long enough after the twisting jaws are released to allow the length of chain to slip through the jaws and drop out of the machine. The mechanism for controlling this operation is shown in Figs. 1, 30, 31 and 32 and will presently be described.

The turret 1 now indexes to bring the link to the first or forming position A while the lever 236 moves the twisting jaws 243 to one side to the position shown in Fig. 21 in readiness to grasp the next link brought around as the turret indexes. The twisted link which has just been transferred to the first or forming position A will have a portion held in an upright position by the transfer jaws 2 and 3 and the opening through this twisted upright portion is held in alignment with the path of movement of the wire blank 60 from the cut off quill 50 so that the blank will pass through the link, as it is moved to the forming position. Thus as the blank is formed the links are connected to each other. However, just prior to the feeding of the blank 60 through the previously formed link the slide 69 carrying the forming tools 77 is advanced toward the turret to bring the lugs 94 to a position forwardly of the blank as shown in Fig. 7. At the same time the finger 69' engages the end of the previously formed link and insures that it is in the proper position in the transfer jaws 2 and 3. If the link projects too far from the transfer jaws the finger 69' will force it back to the proper position. The end of finger 69' is formed with a recess 69'' to fit the link. The slide 69 now starts to move backwardly and the form 58 is moved upwardly to the forming position as shown in Fig. 5, the top of this form being provided with a groove 58' to clear the end of finger 69'. The transfer jaw 3 is then opened by screw 64 on lever 61 and the new blank fed into position through the previously formed link and between the transfer jaws 2 and 3 and forms 58. Pin 64 is then raised and jaw 3 grips the blank, and tools 77 bend it about the form 58 as previously described. When the jaw 3 is opened for the insertion of the new blank 60 the previously formed link is, of course, released. A spring finger 61' is therefore, mounted on lever 61 and as the end of the lever draws to open jaw 3 this finger 61 engages the previously formed link and holds it in proper position until the jaw 3 is again closed. The link engaging end of the finger 61' is concaved, as shown at 61'', to engage the link.

*Indexing mechanism.*—The indexing mechanism for the turret or dial 1 is shown in Figs. 27 and 28. Mounted in the frame 13 is an upright bushing 310 having an enlarged head 311 resting on the top of the frame and this bushing forms a bearing for the cylindrical or shaft portion 312 of the turret or dial 1, this turret being provided with a shoulder 313 resting on the top of the bushing. Secured to the lower end of the cylindrical portion or shaft 312 is a ratchet 314 provided with a plurality of notches 315, the number of notches corresponding to the number of working stations, in the present instance there being four of these notches. Keyed to this ratchet is an index plate 316 also provided with a plurality of notches 317 corresponding in number to the number of stations. A rock arm 318 is mounted to turn relative to the ratchet and carries a pawl 319 pivoted thereto at 320, the free end of this pawl being adapted to seat in the notches 315, and it is held against the ratchet by a spring 321. A rod 322 is pivoted to this rock arm at 323 and to a reciprocating element 324 at 325. This element 324 has an elongated slot 326 through which the shaft 230 extends. The shaft therefore, forms a guide for the element to help maintain it in proper alignment. The other end of the element is provided with a projecting rod 327 running in a guide 328 carried by the bracket 329. This member carries a roller 330 running in a cam groove 331 in the cam element 332 mounted on the shaft 230. It will be apparent that as the cam element 332 rotates the member 324 will be reciprocated and through the connecting rod 322 will oscillate the rock arm 318 and the pawl 319 carried thereby, and as this pawl engages in the notches 315 in the ratchet 314 will rotate the turret 1 with a step by step movement, in the present case a one-quarter revolution at a time.

Means is provided for locking the turret between these movements. For this purpose a slide 333 is mounted in the bracket 329 and has a projecting end 334 adapted to seat in the notches 317 in the index plate 316 which is rigidly secured to the ratchet and the shaft 312 of the turret. A lever 335 is pivoted to the bracket 329 at 336 and has a head 337 engaging the shoulder 338 on the slide 332, and at its opposite end there is a roller 339 running on a cam 340 on the shaft 230. A spring 341 tends to move the slide 333 to the locking position. It will be apparent that in certain timing relation with the operations on the link 60 the cam 340 will retract the slide 333 and unlock the turret, and that then the cam 331 acting through the pawl and ratchet will rotate the turret a quarter revolution for the indexing operation.

To prevent the turret running by its proper position because of its momentum a friction plate or brake 342 is mounted on the head of the turret and engages the enlarged head 311 of the bushing 310 with a spring pressure. The amount of this pressure, and therefore, the braking effect may be adjusted by the screw 343.

*Chain release mechanism.*—Means is provided for determining the lengths of the chain and for dropping the lengths of chain from the machine as they are completed. This mechanism is shown in Figs. 1, 30, 31 and 32. As indicated above if the transfer jaw 3 is held released until after the completed chain link is released by the twisting jaws 243, the link will slide through the transfer jaws and the completed length of chain will drop from the machine through the central passage 344 (Figs. 28 and 29) through the turret and its shaft 312. As indicated in connection with the twisting mechanism and shown in Fig. 26, the transfer jaw 3 is held open or released by the rod 299 operated by lever 301 and cam element 304. The cam element 304 is also provided with two cam surfaces indicated at 345 and 346 upon which the roller 303 may run in addition to cam 304'. This roller is carried on a plunger 347 which is longitudinally slidable in its bearing 348 carried by the lever 301. It is embraced by a coil spring 349 reacting at one end against the bearing 348 and at its other end against a collar 350 carried by the plunger, and this spring tends to hold the plunger and the roller in its inner position as shown in Fig. 30. A rod 351 is connected to the end of this plunger by a ball and socket connection 352, and is slidable in a bearing 353 on a cap 354 secured to the bracket 355, which bracket is mounted on the frame 13. This bracket has a bearing 356 for a bearing pin 357 on a lever 258 which carries a pivoted pawl 359 held against the periphery of the ratchet 360 by a spring 361. A lever 362 is mounted on the end of the pin or bearing 357 which projects from the bracket, and carries a roller 363 running on a cam 364 carried by the shaft 17. The ratchet 360 is mounted to rotate on the end 365 of a pin 366 which projects through a bearing 367 in the cap 354 and has a flange 368 in a bored recess 369 in the cap, and which recess forms a bearing for this flange. A friction disc 370 of any suitable material, such as wood fibre, is secured to the flange 368 and is held yieldingly against one side of the ratchet by means of a spring 371 embracing the pin 366 and reacting at its opposite ends against the inside of the cap and the flange 368. A friction disc 372 of similar material is secured to the bracket 355 and engages the other side of the ratchet. The ratchet is provided with notches 373 in its periphery to be engaged by the pawl 359, the number of these notches depending upon the number of links each length of chain is to contain. Mounted on the side of the ratchet in position to be engaged by the end of the rod 351 is a cam 374. A pin 375 is mounted in the pin 366 and rests in a notch 376 in the end of the cap 354 and keeps the pin 366 and the friction disc 370 from rotating.

In operation, as the cam 364 is rotated it swings the lever 362 and through it the lever 358 and thus swings the pawl 360 back and forth, the backward movement being imparted by the spring 377, and this movement is limited by the stop screw 378 adjustably mounted in the bracket 355. At every forward movement of the pawl it will engage in one of the notches 373 and will rotate the ratchet 360 a corresponding amount with a step by step movement. The ratchet is prevented from moving too far and is also prevented from moving backwardly when the pawl makes its backward movement by the friction discs 370 and 372 which engage the opposite sides of the ratchet. Normally if the length of the chain is not completed the end of rod 351 will rest against the side surfaces of the ratchet, as shown in Fig. 30, and the roller 303 will be in its inner position. As the cam element 304 rotates this roller 303 will then ride over the short bump or cam 345 at the completion of the twisting operation when the twisting jaws 243 move forwardly to place the twisted link between the transfer jaws 2 and 3, and will release these transfer jaws to receive this twisted link by pressing downwardly on the upper jaw 3 through the rod 299. Immediately after the twisted link is placed in these transfer jaws, and before the twisting jaws 243 release the link, roller 303 rides off the cam bump 345 allowing the transfer jaw 3 to grip the link and hold it in the upright position, as shown in Figs. 5 and 29 so that when it is transferred to the forming position A by the next indexing operation of the turret it will be in the proper position for insertion of the next blank 60 through this link. Should, however, the length of chain be completed then the cam 374 will engage the end of rod 351 and will push it outwardly or downwardly as viewed in Figs. 30 and 32, and move the roller 303 to the position shown in Fig. 32 where it is in alignment with the path of movement of the longer cam bump 346. It will then be apparent that as the transfer jaw 3 is released to receive the twisted link, as above described, when it is advanced by the twisting jaws 243, the cam 346 will prevent the transfer jaw 3 from closing on the link until after the twisting jaws have released the link. There is, therefore, nothing to hold the link or the length of the chain, as shown at 379 in Fig. 29, and the weight of the chain will draw the last link through the transfer jaws and the length of chain will drop through the passage 344 through the turret. As there are four sets of transfer jaws, and are, therefore, four chain lengths which will be completed in succession, the cam 374 on the ratchet 360 is of a length to hold the rod 351 and roller 303 in the extended or chain length dropping position, as shown in Fig. 32, for four revolutions of the machine or four indexing operations. This, of course, corresponds to four step by step movements of the ratchet 360. The number of links in a length will, of course, be determined by the number of notches in the ratchet 360.

If it is desired to make a continuous chain of an indefinite length the ratchet 360 and its cam 374 may be placed out of operation by sliding the pin 366 outwardly and turning it so that the pin 375 will rest on the end 379 of the cap 354, as shown in dotted lines Fig. 30. This will relieve the frictional pressure on the ratchet and cause it to merely oscillate back and forth with the pawl 359 without rotating, so that the cam 374 will not be brought into engagement with the rod 351 and allow the chain to drop from the machine.

*Drive.*—Referring to Figs. 1 and 26, a pulley 381 may be driven from any suitable source of power, and this pulley may be connected and disconnected from driving relation with the shaft 382 by any suitable form of clutch 383 operated by a hand lever 384 placed at the front of the machine where it is easily accessible to the operator, and which is connected to the clutch by a suitable rod 385. A hand wheel 386 may be secured to the forward end of the shaft 382 to allow for hand operation of the machine in setting up. A pinion 387 on the shaft 382 meshes with the gear 198 on shaft 17. A gear 388 is mounted on the shaft 17 and meshes with a similar gear 389 on shaft 230 which is located below shaft 17, these two gears being of the same diameter so that the ratio between the shafts is one to one. A bevel gear 390 also mounted on the shaft 17 meshes with a similar gear 391 on the shaft 32 to drive this shaft.

From the foregoing description it will be apparent that the stock is automatically taken from a suitable source of supply, as a reel 9, is straightened, cut off to proper lengths and fed into the machine in position to be formed into links, and that the cut off links are then automatically bent to shape with butting free ends. These butting ends are then automatically welded, the weld is swaged and trimmed to make the stock of the link substantially the same diameter throughout, the link is automatically twisted through substantially ninety degrees intermediate its length, and is then placed in position for insertion of the blank for the next link, and that these operations are carried on continuously. It is to be especially noted that these operations are being performed simultaneously on different lengths of chain so that the time interval of one rotation of the machine is available for each operation. Thus a maximum capacity of the machine is secured, but plenty of time is available for each individual operation.

Having thus set forth the nature of my invention, what I claim is:

1. In a chain making machine, a plurality of working stations, means at one of the stations for intermittently feeding a continuous wire, means for cutting it to length, and means for bending the cut length into a link, devices at the other stations for performing different operations on the formed link, a rotatable holder for said link, means for rotating said holder with a step by step motion to bring said link successively to the various stations, and means for operating the devices at the different stations in certain timed relation with the movements of the holder.

2. In a chain making machine, a rotatable holder for a chain link, a plurality of working stations located about said holder, means at one of the stations for intermittently feeding a continuous wire, means for cutting it to length, and means for bending the cut length into a link, devices at the other stations for performing different operations on the formed link, means for operating said devices, and means for rotating said holder in certain timed relation with the operation of said devices to bring the link to the various stations.

3. In a chain making machine, a rotatable support, a plurality of chain link holders mounted on said support, a plurality of working stations located about said support, means at one of the stations for intermittently inserting a substantially straight length of wire through a previously formed link held by a holder, means for bending the wire into a loop to form a link, devices at the other stations for simultaneously performing different operations on links held by the various holders, means for rotating said support to bring the various links successively to the different stations, and means for operating the said devices in certain timed relation with the movement of said support.

4. In a chain making machine, a rotatable support, a plurality of chain links holders mounted on said support, a plurality of working stations located about said support, means at one of the stations for cutting a continuous wire to length and inserting it through a previously formed link held in a holder, means for then bending said length of wire into a loop to form a link, devices at the other stations for simultaneously performing different operations on links held by the various holders, and means for rotating said support with a step by step movement in certain timed relation with the operation of said devices.

5. In a chain making machine, a plurality of working stations, means at one of the stations for feeding lengths of wire successively into a single previously formed link only, devices at said station for bending said pieces of wire into loops with the ends butting, means at the next adjacent station for welding the butting ends, means at the next station for swaging and trimming the weld, a movable holding means for the link being operated upon, and means for advancing the holding means to transfer the link from station to station in the order named.

6. In a chain making machine, a plurality of working stations, means at one of the stations for feeding lengths of wire successively into a single previously formed link only, means at said station for bending said pieces of wire into loops with the ends butting, means at another station for welding the butting ends, a movable holding means for the links being operated upon, and means for advancing the holding means to transfer the link from the bending to the welding station.

7. In a chain making machine, a plurality of working stations, means at one of said stations for inserting a length of wire through a single previously formed link only, devices at said station for bending said piece of wire into a loop with the ends butting, means at the next adjacent station for welding the butting ends, means at the next station for swaging and trimming the weld, means at the next station for twisting one end of the loop through an angle so that the two portions of the link extend transversely to each other, a movable holding means for the link being operated upon, and means for advancing the holding means to transfer the link from station to station in the order named.

8. In a chain making machine, a rotatable support, a plurality of chain link holders mounted on said support, a plurality of working stations located about said support, means at one station for inserting a piece of wire through a single previously formed loop only, means for bending said piece of wire into a loop with the ends abutting, means at another station for welding the butting ends, means at another station for swaging and trimming the weld, means at another station for twisting the link so that the two portions thereof extend transversely of each other, and means for rotating the support with a step by step movement to bring the links to the various stations in the order named.

9. In a chain making machine, a rotatable support, a plurality of chain link holders mounted on said support, a plurality of working stations located about said support, means at one station for bending a piece of wire into a loop with the ends butting, means at another station for welding the butting ends, means at another station for twisting the link after the welding operation so that the two opposite end portions extend transversely of each other, and means for rotating the support with a step by step movement to transfer the links to the various stations in the order named.

10. In a chain making machine, a rotatable support, a plurality of chain link holders mounted on said support, a plurality of working stations located about said support, means at one station for bending a piece of wire into a loop with the ends butting, means at another station for welding the butting ends, means at another station for twisting the link so that the two opposite end portions extend transversely of each other, means at the first station for inserting a similar piece of wire through the twisted link, and means for rotating the support with a step by step movement in certain timed relation with the operation of said means to transfer the links to the various stations in the order named.

11. In a chain making machine, a rotatable support, a plurality of chain link holders mounted on said support, a plurality of working stations located about said support, means at the first station for intermittently feeding a substantially straight continuous wire, means for cutting the wire into lengths, means for inserting the cut lengths through previously formed links held by said holders, means for then bending the length into a loop to form a link, means at the other stations to perform different operations on links held by the respective holders, means for operating the said mentioned means, and means for rotating the support to bring the respective links successively to the different stations.

12. In a chain making machine, a rotatable support, a plurality of chain link holders mounted on said support, a plurality of working stations located about said support, means at one of the stations for feeding a substantially straight piece of wire to a holder and bending it into a link, means at the other stations for simultaneously performing different operations on a plurality of links held by the holders at the said stations, and means for rotating the support with a step by step movement to bring each holder successively to the respective stations.

13. In a chain making machine, a rotatable support, a plurality of sets of clamping jaws carried by said support, a plurality of working stations about said support, means for rotating the support with a step by step movement, means at one of said stations for successively opening the respective jaws, inserting a substantially straight piece of wire between them and releasing the jaws to grip the wire and means at said station for bending the wire into a loop after it is gripped by the jaws.

14. In a chain making machine, a rotatable support, a plurality of sets of clamping jaws carried by said support, a plurality of working stations about said support, means for indexing said support to bring the jaws successively to the respective stations, means at one station for opening the jaws at that station, means for inserting a piece of wire into the opened jaws to be gripped thereby, and means at said station for bending the wire into a loop with the ends butting after it is inserted in the jaws, and means for operating all of said foregoing means in certain timed relation.

15. In a chain making machine, a rotatable support, a plurality of chain link holders carried by said support, a plurality of working stations located about said support, means located at one of said stations for releasing the holder at that station for insertion of a length of wire to form a link, means for inserting said wire in the holder, guide means for said wire comprising relatively movable butting guides, means for indexing the support to bring the holders successively to the various stations, and means for moving one of said guides laterally with respect to the other guide to sever the wire and move the first guide out of the way of the support as it is indexed.

16. In a chain making machine, a movable support, a plurality of chain link holders carried by said support, means for bending a piece of wire into a loop with the ends butting comprising a form, jaws on opposite sides of the form arranged to engage the projecting portions of the wire, means for imparting backward, inward and forward movements to the jaws to bend the wire about the form, and means for indexing the support to bring the holders successively to the forming position, and means for operating all the foregoing means in certain timed relation.

17. In a chain making machine, a movable support, a plurality of chain link holders carried by said support, means for bending a piece of wire into a loop with the ends butting comprising a form, jaws on opposite sides of the form arranged to engage the projecting portions of the wire, means for imparting backward, inward and forward movements to the jaws to bend the wire about the form, means for indexing the support to bring the holders successively to the forming position, and means for moving the form to and from the forming position in certain timing relation with the operation of the indexing means.

18. In a chain making machine, a movable support, a plurality of chain link holders carried by said support, means for feeding a length of wire to the holders in a given position, means for bending the length of wire in the holder into a loop with the ends butting comprising a form at one side of said length of wire, jaws on opposite sides of the form arranged to engage the portions of the wire on opposite sides of the form, means for imparting backward, inward and forward movements to the jaws to bend the wire about the form, means for indexing the support to bring the holders successively to the forming position, and means for moving the form to and from the forming position in certain timing relation with the feeding and indexing operations.

19. In a chain making machine, a support, a plurality of chain link holders carried by said support, means for bending a piece of wire into a loop with the ends butting comprising a form, a slide movable toward and from the form, a pair of jaws pivoted to the slide, means for operating the jaws and slide to bend the wire about the form, and means for indexing the support to bring the holders successively to the forming position.

20. In a chain making machine, a support, a plurality of chain link holders carried by said support, means for bending a piece of wire into a loop with the ends butting comprising a form, a slide movable toward and from the form, a pair of jaws pivoted to the slide, means for operating the jaws and slide to bend the wire about the form, means for indexing the support to bring the holders successively to the forming position, and means for withdrawing the form from the forming position prior to the indexing operations.

21. In a chain making machine, a movable support, a plurality of chain link holders carried by said support, means for bending a piece of wire into a loop with the ends butting comprising a form, jaws on opposite sides of the form arranged to engage the projecting portions of the wire, means for imparting backward, inward and forward movement to the jaws to bend the wire about the form, means for then retracting the jaws, means for removing the form from forming position, and means for indexing the support to bring another holder to the forming position.

22. In a chain making machine, a movable support, a plurality of chain link holders carried by said support, means for bending a piece of wire into a loop with the ends butting comprising a form, jaws on opposite sides of the form and above the wire and provided with downwardly extending lugs arranged to engage the projecting portions of the wire, means for imparting backward, inward and forward movements to the jaws to bend the wire about the form, and means for indexing the support to bring the holders successively to the forming position.

23. In a chain making machine, a support mounted to rotate about an upright axis, a plurality of chain link holders carried by said support, means for bending a piece of wire into a loop with the ends butting comprising a form, a vertically movable slide for said form, a slide movable laterally toward and from the form, a pair of jaws pivoted to the slide, means for operating the jaws and slide to bend the wire about the form, means for indexing the support to bring the holders successively to the forming position, and means for operating the vertically movable slide in certain timing relation with the indexing operation.

24. In a chain making machine, a movable support, a plurality of chain link holders carried by said support, means for bending a piece of wire into a loop with the ends butting, means for welding the butting ends comprising a pair of contacts to engage the link on opposite sides of and spaced from said ends, independent slides for said contacts, means for independently operating the slides to bring the contacts into engagement with the link, and means for indexing the support to transfer the links from the forming mechanism to the welding mechanism.

25. In a chain making machine, a movable support, a plurality of chain link holders carried by said support, means for bending a piece of wire into a loop with the ends butting, means for welding the butting ends comprising a pair of contacts to engage the link on opposite sides of said ends, each contact engaging one section only of the link, means for moving said contacts to engagement with the link independently of each other, and means for indexing the support to transfer the links from the forming mechanism to the welding mechanism.

26. In a chain making machine, welding mechanism for welding the butting ends of a formed link comprising a pair of contacts adapted to engage the link on opposite sides of and at a distance from said ends and mounted for movement to said position independently of each other, means for retracting the contacts after the welding operation, means for transferring the links to and from the welding position, and means operated in certain timed relation with said transferring means to independently shift said contacts.

27. In a chain making machine, welding mechanism for welding the butting ends of a formed link comprising a pair of electrical contacts to engage the link on opposite sides of said ends, means for yieldingly pressing the ends together in a direction longitudinally of the link during the welding operation, and means for transferring the links to and from welding position.

28. In a chain making machine, welding mechanism for welding the butting ends of a formed link comprising a pair of electrical contacts to engage the link on opposite sides of said ends, a pair of jaws arranged to engage the link on opposite sides of said ends, spring operated means tending to force said jaws together during the heating operation, and means for transferring the links to and from the heating position.

29. In a chain making machine, welding mechanism for welding the butting ends of a formed link comprising a pair of contacts to engage the link on opposite sides of said ends, a slide movable toward and from said link, a pair of jaws pivoted to the slide, yieldable means for clamping the jaws against the link to press the ends together in a direction longitudinally of the link, and means for transferring links to and from the welding position.

30. In a chain making machine, welding mechanism for welding the butting ends of a formed link comprising a pair of electrical contacts to engage the link on opposite sides of said ends, a pair of pivoted levers, jaws carried thereby and arranged to engage the link on opposite sides of said ends, a wedge for operating the levers to clamp the jaws against the link, a spring for operating the wedge, and means for transferring the links to and from the welding position.

31. In a chain making machine, welding mechanism for welding the butting ends of a formed link comprising a pair of contacts to engage the link on opposite sides of said ends, a slide, a pair of jaws movably mounted on the slide and adapted to engage the link on opposite sides thereof to press the ends together, means for limiting the movement of the slide to bring the jaws to clamping position, a movable cam for operating the jaws, a lost motion connection between the cam and the slide, means including a spring for operating the cam to clamp the jaws on the link, and means for transferring the links to and from the welding position.

32. In a chain making machine, a support mounted to rotate about an upright axis, a plurality of link holders mounted on said support, a pair of slides, contacts carried by said slides and adapted to engage the opposite sides of a formed link having butting ends, means for moving the contacts independently to link engaging position, an upright slide, a pair of jaws pivotally mounted on said slide and adapted to engage opposite sides of the link, a cam for clamping the jaws on the link, means for moving the slide to bring the jaws to clamping position, means including a spring for operating the cam to clamp the jaws, and means for rotating the support to transfer the links to and from the welding position.

33. In a chain making machine, electrical means for welding the ends of a formed link, means for pressing the ends of the link together during the welding operation, a slide, a pair of levers carried by the slide, a pair of swaging jaws carried by the levers, means for operating the levers to clamp said jaws about the welded joint, a trimmer carried by one of the levers, means for operating the lever to trim off surplus metal after the swaging operation, means for operating the slide in certain timing relation with the operation of said levers, and means for transferring links to and from the welding and swaging position.

34. In a chain making machine, electrical means for welding the ends of a formed link, means for pressing the ends of the link together during the welding operation, a movable support, a pair of swaging jaws carried by the support, means for clamping said jaws about a welded joint, a trimming means carried by the support, means for operating the trimming means to remove surplus metal after the swaging operation, means for moving the support to bring the swaging and trimming means to operative position, and means for transferring formed links to and from the welding and swaging positions.

35. In a chain making machine, electrical means for welding the ends of a formed link, means for pressing the ends of the link together during the welding operation, a movable support, a pair of levers pivoted to the support, a pair of swaging jaws carried by said levers, means for operating the levers to clamp the jaws about a welded joint, a trimmer carried by one of the levers, an anvil carried by the support arranged to cooperate with the trimmer, means for operating the trimmer to remove surplus metal after the swaging operation, means for moving the support to bring the swaging and trimming means to operative position, and means for transferring formed links to and from the welding and swaging positions.

36. In a chain making machine, means for forming an oval link, holding means for the link arranged to grip one side thereof, a slide, a lever pivoted to the slide, a rotatable member carried by the lever, a pair of jaws carried by said member adapted to grip said link, a movable pin, means to move the pin to a position within the link, means for operating the jaws to grip the link, means for moving the slide and swinging the lever to swing the link about said pin, and means for rotating said member to twist the link intermediate the ends thereof.

37. In a chain making machine, a rotatable support, a plurality of link holders carried by said support to grip the link and then turn it on the previously formed link, a slide, a pair of jaws carried by said slide adapted to grip a link while held by said holders, means for operating the jaws to grip the link, means for moving the slide toward and from said support, means for rotating the jaws to twist the link intermediate the ends thereof, and means for rotating said support in certain timed relation with the operation of said jaws.

38. In a chain making machine, means for forming an oval link, a rotatable support, a plurality of link holders carried by said support arranged to grip one side of a formed link, a slide, a lever pivoted to the slide, a rotatable member carried by the lever, a pair of jaws carried by said member adapted to grip said link, a pin movable to and from a position within the link, means for operating the jaws to grip the link, means for moving the slide and swinging the lever to swing the link about said pin as a pivot, means for rotating said member to twist the link intermediate the ends thereof, means for indexing the support in certain timing relation with the operation of said link twisting mechanism, and means for shifting said pin in certain timing relation with said indexing operation.

39. In a chain making machine, means for forming an oval link, a rotatable support, a plurality of link holders carried by said support arranged to grip one side of a formed link, a pin movable to and from a position within the link, a movable member, a pair of jaws carried by said member, means for operating the jaws to grip the link, means for moving said member to swing the link about the pin as a pivot and to then twist the link intermediate the ends thereof, means for indexing the support in certain timing relation with the operation of said twisting means, and means for shifting said pin in certain timing relation with the indexing operation.

40. In a chain making machine, means for forming an oval link, a rotatable support, a plurality of link holders carried by said support arranged to grip one side of a formed link, a slide provided with an upright bearing, a lever having a projection in said bearing, a rotatable member provided with a spur gear carried by said lever, a pair of jaws carried by said member adapted to grip a link carried by a holder, means for operating said jaws to grip the link, a pin movable to and from a position in the link, a slidable rack meshing with said spur gear to rotate the member carrying the jaws, means for moving the slide and swinging the lever to swing the link about the pin, and means for operating the rack to twist the link.

41. In a chain making machine, means for forming an oval link, a movable support, a plurality of holders carried by said support arranged to grip one side of a formed link, a movable member mounted for lateral, swinging and rotary movements, a pair of jaws carried by said member, a pin movable to and from a position within the link, means for operating said jaws to grip the link, means for moving the member laterally and swinging it to swing the link about said pin, means for then gripping the link to provide an additional support, and means for then rotating the member to twist the link.

42. In a chain making machine, a rotatable support, a plurality of link holders carried by said support comprising pairs of jaws having upright and horizontal grooves for clamping both upright and horizontal connected links at the same time, and means for operating said jaws.

43. In a chain making machine, a rotatable support, a plurality of link holders carried by said support comprising pairs of jaws having upright and horizontal grooves, means for forming a link when held in said horizontal grooves, means for gripping the projecting portion of the link and twisting it to an upright position, means for advancing the twisting means to place the upright portion of the link in said upright grooves, and means for operating the jaws.

44. In a chain making machine, a support rotatable about an upright axis, a plurality of chain link holders carried by said support and comprising pairs of jaws having upright and horizontally extending recesses, a plurality of working stations located about said support, means at one of said stations for feeding a piece of wire into the horizontally extending recesses, means for forming said wire into a loop, means at another station for twisting said loop so that a portion of it is in an upright position, means for operating the jaws, means for advancing the twisting means after the twisting operation to place the upright portion of the link in the upright recesses, and means for indexing the support to transfer the upright link to the feeding station.

45. In a chain making machine, a support rotatable about an upright axis, a plurality of chain link holders carried by said support and comprising pairs of jaws having upright and horizontally extending recesses, a plurality of working stations located about said support, means at one of said stations for feeding a piece of wire into the horizontally extending recesses, means for forming said wire into a loop, means at another station for twisting said loop so that a portion of it is in an upright position, means for operating the jaws, means for advancing the twisting means after the twisting operation to place the upright portion of the link in the upright recesses and the opening therethrough in alignment with the horizontally extending recesses, and means for indexing the support to transfer the upright link to the feeding station in position for the insertion of another length of wire through said link.

46. In a chain making machine, a support rotatable about an upright axis, a plurality of chain link holders carried by said support and comprising pairs of jaws having upright and horizontally extending recesses, a plurality of working stations located about said support, means at one of said stations for feeding a piece of wire into the horizontally extending recesses, means for forming said wire into a loop, means at another station for twisting said loop so that a portion of it is in an upright position, means for advancing the twisting means after the twisting operation to place the upright portion of the link in the upright recesses, means for indexing the support to transfer the upright link to the feeding station in position for insertion of another length of wire through said link and into the horizontal recesses, means for releasing the jaws to allow insertion of said wire, and means for holding the upright link while the jaws are released.

47. In a chain making machine, a support rotatable about an upright axis, a plurality of chain link holders carried by said support and comprising pairs of jaws having upright and transversely extending recesses, a plurality of working stations about said support, means at one of the stations for twisting a formed link and placing the upright portion thereof in the upright recesses, means for indexing the support for transferring the link to another station, a lever at the latter station arranged to engage the upper jaw to release it, a yieldably mounted finger carried by the lever to hold the link while the jaw is released, and means for inserting a length of wire through the link and into the transverse recesses while the jaw is released.

48. In a chain making machine, a support rotatable about an upright axis, a plurality of chain link holders carried by said support, said support being provided with a discharge passage leading from the holders, a plurality of working stations located about said support, means at said stations for forming a chain of interconnected links, and means for releasing the holders to allow the chains to drop therefrom after a predetermined number of links have been formed.

49. In a chain making machine, a support rotatable about an upright axis, a plurality of chain link holders carried by said support, a plurality of working stations located about said support, means at said stations for forming interconnected links, and counting mechanism operated in certain timing relation with said link forming means to release the chain lengths at a predetermined time.

50. In a chain making machine, a rotatable support, a plurality of chain link holders carried by said support comprising pairs of jaws provided with transverse and upright recesses, a plurality of working stations about said support, means at one of the stations for gripping a link held by said jaws in the transverse recesses and twisting it intermediate its length to an upright position, means for then advancing the twisting means to place the upright portion of the link in the upright recesses, means for releasing the jaws during the advance movement of the link and allowing them to grip the link prior to the release of the link by the twisting means, and means for at predetermined times holding the jaws released until after the link is released by the twisting means.

51. In a chain making machine, a rotatable support, a plurality of chain link holders carried by said support, a plurality of working stations about said support, means at one of the stations for shifting the links in the holders, a plurality of means for releasing the holders during the shifting operation and arranged to hold them released for different periods, means for indexing the support, and means operated in certain timing relation with the indexing means for determining which releasing means shall be effective.

52. In a chain making machine, a chain link holder, means for releasing said holder including a plurality of cam surfaces of different shapes, means cooperating with said surfaces for releasing the holder, and means for shifting said cooperating means from one cam surface to another.

53. In a chain making machine, a rotatable support, a plurality of chain link holders carried by said support, means for releasing said holders including a plurality of cam surfaces of different shapes, means cooperating with said cam surfaces for releasing the holders, means for indexing the support, and means operated in certain timing relation with the indexing means for shifting said cooperating means from one of said cam surfaces to another.

54. In a chain making machine, a rotatable support, a plurality of chain link holders carried by said support, means for releasing said holders including a plurality of cam surfaces of different shapes, means cooperating with said cam surfaces for releasing the holders, means for indexing the support, a ratchet, means for operating said ratchet in certain timing relation with the said indexing means, a cam operated by said ratchet, and means operated by said latter cam for shifting the cooperating means from one cam surface to another.

55. In a chain making machine, a rotatable support, a plurality of chain link holders carried by said support comprising sets of jaws to grip the links, a plurality of working stations located about said support, means for forming interconnected links at said stations, a lever at one of the stations arranged to release said jaws, a plurality of cams of different shapes, a roller carried by said lever and adapted to cooperate with said cams, means for indexing said support, a cam operated in certain timing relation with said indexing means, and means operated by said latter cam for shifting said roller from cooperation with one cam to cooperation with another cam.

In testimony whereof I affix my signature.

ARTHUR J. LEWIS.